United States Patent
Larsen

(10) Patent No.: US 6,921,469 B2
(45) Date of Patent: Jul. 26, 2005

(54) ELECTRODE CONSTRUCTS, AND RELATED CELLS AND METHODS

(75) Inventor: Lewis G. Larsen, Chicago, IL (US)

(73) Assignee: Lattice Energy LLC, Chicago, IL (US)

(*) Notice: Subject to any disclaimer, the term of this patent is extended or adjusted under 35 U.S.C. 154(b) by 332 days.

(21) Appl. No.: 10/107,747

(22) Filed: Mar. 26, 2002

(65) Prior Publication Data

US 2004/0108205 A1 Jun. 10, 2004

(51) Int. Cl.[7] ............................................. C25B 11/10
(52) U.S. Cl. ........................ 204/290.12; 204/290.03; 204/280
(58) Field of Search ...................... 204/290.12, 290.13, 204/280

(56) References Cited

U.S. PATENT DOCUMENTS

| | | |
|---|---|---|
| 4,414,064 A | 11/1983 | Stachurski et al. |
| 4,943,355 A | 7/1990 | Patterson |
| 5,036,031 A | 7/1991 | Patterson |
| 5,281,485 A | 1/1994 | Colgan et al. |
| 5,318,675 A | 6/1994 | Patterson |
| 5,372,688 A | 12/1994 | Patterson |
| 5,494,559 A | 2/1996 | Patterson |
| 5,607,563 A | 3/1997 | Patterson et al. |
| 5,616,219 A | 4/1997 | Patterson |
| 5,618,394 A | 4/1997 | Patterson |
| 5,628,886 A | 5/1997 | Patterson |
| 5,628,887 A | 5/1997 | Patterson et al. |
| 5,632,871 A | 5/1997 | Patterson |
| 5,635,038 A | 6/1997 | Patterson |
| 5,672,259 A | 9/1997 | Patterson |
| 5,676,816 A | 10/1997 | Patterson |
| 5,755,937 A | 5/1998 | Patterson et al. |
| 5,837,454 A | 11/1998 | Cozzette et al. |
| 6,057,237 A | 5/2000 | Ding et al. |
| 6,140,234 A * | 10/2000 | Uzoh et al. .................. 438/678 |
| 6,599,404 B1 | 7/2003 | Miley |

FOREIGN PATENT DOCUMENTS

WO     WO 98/07898     2/1998

OTHER PUBLICATIONS

Xi, Haiwen; Bian, Bo; Laughlin, David E.; and White, Robert M. 2000. Exchange biasing in sputtered NiFe/PtMn/ bilayers. Journal of Applied Physics vol. 87, No. 9, pp. 4918–4920.

Jeong, Sangki; Hsu, Yu-Nu; Laughlin, David E.; and McHenry, Michael E. Sep. 2000. Magnetic Properties of Nanostructured CoPt and FePt Thin Films, IEEE Transactions on Magnetics, vol. 36, No. 5, pp. 2336–2238.

Petersen, Carl. 1995. Growth of Ultrathin Body–Centered Cubic Cobalt Films on an Atomically Clean Iron (100) Crystal Substrate.

Randler, R.J.; Kolb, D.M.; Ocko, B.M.; Robinson, I.K. 2000. Surface Science 447, pp. 187–200.

Ocko, B.M.; Robinson, I.K.; Weinert, M.; Randler, R.J.; and Kolb, D.M. Jul. 1999. Thickness Induced Buckling of bcc Copper Films. Physical Review Letters. vol. 83, No. 4, pp. 780–783.

(Continued)

*Primary Examiner*—Bruce F. Bell
(74) *Attorney, Agent, or Firm*—Woodard, Emhardt, Moriarty, McNett & Henry LLP

(57) ABSTRACT

Described are preferred electrode structures which desirably include multiple thin conductive layers stably bonded to an electrode substrate through a bonding layer. Also described are preferred electrode structures which include reinforcing carbon layers, which include an embrittlement-sensitive material and a protective oxygen-free copper layer, and which include at least one thin metal layer including a bamboo grain pattern. Additional embodiments of the invention include electric cells incorporating such electrode structures, and methods for their operation.

163 Claims, 3 Drawing Sheets

OTHER PUBLICATIONS

Herman, M.A. 1999. Silicon–Based Heterostructures: Strained–Layer Growth by Molecular Beam Epitaxy. Cryst. Res. Technol. pp. 583–595.

Wagner, R.; Schiatterbeck, D.; Christmann, K. 1999. Surface Science 440, pp. 231–251.

Andrieu, Stephane; Turban, Pascal; Muller, Pierre; Lapena, Laurent. Elastic Relaxation During Pseudomorphic MBE Growth Of Metals.

Valeri, S.; Borghi, A.; Gazzadi, G. C.; di Bona, A. 1999. Growth and Structure of cobalt oxide on (001) bct cobalt film. Surface Science 423, pp. 346–356.

Schwarzer, R. A.; Huot, A. 2000. The Study of Microstructure on a Mesoscale by ACOM. Cryst. Res. Technol., pp. 851–862.

Kierren, B.; Bertran, F.; Gourieux, T.; Malterre, D.; Krill, G. Surface and interface cerium electronic configuration in Ce/Fe (100). Europhys. Lett, 33(1), pp. 35–40 (1996) Printed from Internet Aug. 25, 2001.

MEMS Thin Film Deposition Processes, printed from Internet Aug. 28, 2001.

FeAu multilayers. Printed from Internet Aug. 28, 2001.

Heteroepitaxy with Large lattice Mismatch, printed from Internet Aug. 30, 2001.

Johnson, E. Multiphase and Multicomponent Nanoscale Inclusions in Aluminum, Printed from Internet Sep. 5, 2001.

Cunningham, James A. Using Electrochemistry to Improve Copper Interconnects. May 11, 2000.

Kin, S.–K; Kim, J.–S; Han, J. Y.; Seo, J. M.; Lee, C. K.; Hong, S. C. 2000. Surface alloying of a Co film on the Cu (001) surface. Surface Science 453, pp. 47–58.

Pops, Horace. Physical Metallurgy of Electrical Copper Conductors. Essex Group, Inc. For WAI Nonferrous Wire Handbook –vol. 3.

Appendix 4, Materials for Cold Fusion. Printed from the Internet Sep. 5, 2001.

Pelletier, J. F.; Huot, J.; Sutton, M.; Schulz, R.; Sandy, A. R.; Lurio, L. B. and Mochrie, S. G. J. Hydrogen desportion mechanism in MgH2–Nb nanocomposites. Physical Review B. vol. 63, May 2003.

Gramberg, U.; Renner, M.; and Hiekmann, H. Tantalum as a material of construction for the chemical processing industry –A critical survey. Printed from the Internet Sep. 6, 2001.

Mitsubishi Materials Oxygen Free Copper. Printed from the Internet Sep. 7, 2001.

Cunningham, James A. Improving Copper Interconnects: A Search for Useful Dopants. Semiconductor International. Printed from the Internet Sep. 7, 2001.

Sharma, Ashok; Teverovsky, Alexander. Preliminary Reliability Evaluation of Copper–Interconnect Metallization Technology. Printed from Internet Oct. 1, 2001.

Zhang, Jing. Electromigration and Related Integrated Circuit (IC) Failure. Materials Engineering Dept. Drexel University, PA. Jul. 2001.

Hunt, A. W.; Riege, S. P.; and Prybyla, J. A. Healing processes in submicron Al interconnects after electromigration failure. American Institute of Physics. 1997. pp. 2541–2543.

Riege, S. P.; Andleigh, V.; Thompson, C. V.; Frost, H. J. Modeling of Grain Structure Evolution and its Impact on the Reliability of Al(Cu) Thing Film Interconnects. MIT, Dept. of Materials Science and Eng. Printed from the Internet Oct. 28, 2001.

May, Paul. W. CVD Diamond –a new Technology for the Future? School of Chemistry, University of Bristol, Cantock's Close, Bristol BS8 1TS, U.K. Printed from the Internet Sep. 2, 2001.

Sandia National Laboratories. Wear–resistant diamond coating created by Sandia scientists. New Release Apr. 1998. Printed from the Internet Sep. 2, 2001.

Eisenbraun, Eric; Upham, Allan; Dash. Raj; Zeng, Wanxue; Hoefnagels, Johann; Lane, Sarah, Anjum, Dalaver; Kovidenko, Katherine; and Kaloyeros, Alain. Low temperature inorganic chemical vapor deposition of Ti–Si–N diffusion barrier liners for gigascale copper interconnect applications. J. Vac. Sci. Technol. B 18(4), Jul./Aug. 2000.

Bekaert Advanced Coating Technologies, Amherst, NY 14226.

* cited by examiner

Relative Solubility of Hydrogen in Aluminum, Cobalt, Copper, Iron, Kovar, Nickel, Niobium, Palladium, Platinum, Silver, Tantalum, Thorium, Tin, Titanium, Vanadium, and Zirconium

ELECTRODE CONSTRUCTS, AND RELATED CELLS AND METHODS

BACKGROUND

The present invention relates generally to electrical cells, and in one particular aspect to electrical cells having cathodes incorporating multiple thin film metal layers.

As further background, electrolytic cells of various designs have been proposed which incorporate multilayer thin films. For example, Miley et al. used flat stainless steel plates coated with multilayer thin films as electrodes for an electrolytic cell. Such experiments are described in G. Miley, H. Hora, E. Batyrbekov, and R. Zich, "Electrolytic Cell with Multilayer Thin-Film Electrodes", Trans. Fusion Tech., Vol. 26, No. 4T, Part 2, pp. 313–330 (1994). In this prior work, alternating thin-film (100–1000 Angstrom) layers of two different materials (e. g. titanium/palladium) were employed. Others have proposed the use of packed-bed electrolytic cells where small plastic pellets are coated with several micron-thick layers of different materials. See, e. g., U.S. Pat. Nos. 4,943,355; 5,036,031; 5,318,675 and 5,372,688.

Still other electrolytic cells have employed coated electrodes of various forms. For example, U.S. Pat. No. 4,414,064 entitled "Method For Preparing Low Voltage Hydrogen Cathodes" discusses a co-deposit of a first metal such as nickel, a leachable second metal or metal oxide, such as tungsten, and a nonleachable third metal, such as bismuth.

In light of these prior efforts, there remains a need for additional improved and/or alternative electric cell designs which incorporate thin-film (e.g., 10–10,000 Angstrom thick layers) electrode configurations. The present invention addresses this need.

SUMMARY OF THE INVENTION

In one aspect, the present invention provides an electrode construct useful for an electrical cell. The electrode construct includes a non-conductive substrate, and a metallic adhesion coating bonded to the non-conductive substrate. At least one layer of a first conductive metal is bonded to the metallic adhesion coating. At least one layer of a second conductive metal is bonded to the first conductive metal layer. The metal layers of the construct are preferably very thin, for example having a thickness less than about 10,000 Angstroms, usually in the range of about 10 to about 10,000 Angstroms. Desirably, the electrode construct includes alternating layers of said two metals, or of said two metals in combination with one or more additional metals in a repeated sequence. In addition, preferred adhesion coatings for bonding to silicon-containing substrates include multiple layers, for example having a tantalum nitride layer bound to the substrate, and a tantalum layer (especially α-tantalum) bound to the tantalum nitride layer, and copper or another metal bound to the tantalum layer.

In another embodiment, the present invention concerns an article of manufacture that includes a substrate and a material on the substrate that is sensitive to embrittlement, for example embrittlement mediated by the incorporation of ions of hydrogen or its isotopes, for example deuterium. A protective layer is provided atop the embrittlement-sensitive material and includes oxygen-free copper. In one preferred embodiment, the embrittlement-sensitive material is tungsten or a compound of tungsten, e.g. a nitride of tungsten. Preferred articles of manufacture comprise electrode structures that are useful, for example, in the construction of electrical cells.

Another preferred embodiment of the invention provides an electrode useful for an electric cell. The electrode includes a plurality of thin metal layers and an amorphous carbon layer adjacent the thin metal layers. As examples, the amorphous carbon layer can serve to encase the thin metal layers to serve as a protective barrier, and/or may simply be in heat transfer relationship with the thin metal layers and serve to dissipate heat from the thin metal layers.

In another aspect, the invention provides an electrode useful in an electric cell that comprises an electrode structure having a plurality of thin metal layers. The plurality of thin metal layers includes a repeat sequence formed by at least three different metal layers.

Another aspect of the provides an electrode useful in an electric cell that comprises an electrode structure having a plurality of thin metal layers. At least one of the metal layers, and preferably a plurality thereof, comprise a lanthanide metal.

In a still further embodiment of the invention, provided is an electrode useful in an electric cell, having a plurality of thin metal layers, wherein at least one of the thin metal layers exhibits a bamboo grain pattern.

The present invention also includes electric cells incorporating electrode constructs as described herein, and methods involving the operation of such cells.

The present invention provides improved and alternative electrode and electrical cell designs and uses thereof. Additional embodiments as well as features and advantages of the invention will be apparent from the descriptions herein.

BRIEF DESCRIPTIONS OF THE FIGURES

FIG. 1 provides a schematic diagram of a cross-section of a preferred electrode device of the invention.

DESCRIPTION OF THE PREFERRED EMBODIMENTS

For the purpose of promoting an understanding of the principles of the invention, reference will now be made to certain preferred embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As disclosed above, the present invention provides electrode constructs and related conductive articles, electric cells incorporating such electrode constructs, and methods of operating the electrode cells.

Figure 1:
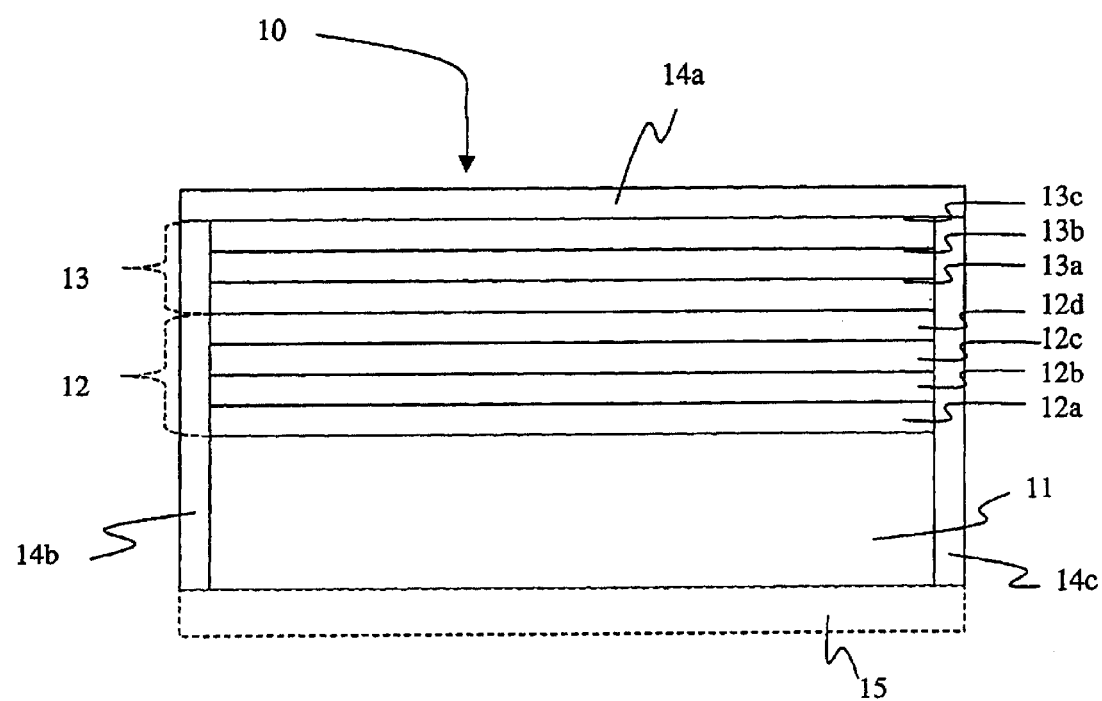

With reference now to FIG. 1, shown is a preferred electrode device of the invention. Electrode device 10 includes a substrate 11 made of a suitable material. The substrate 11 is preferably electrically non-conductive, for example constructed of non-conductive materials such as crosslinked polymers, ceramics, or glass. Electrode substrate 11 is preferably made of a silicon-containing material. Other suitable substrate materials may also be used within the scope of the present invention as will be understood by the skilled practitioner.

Electrode device 10 includes an adhesive coating 12 which may be formed from a single layer of material or multiple layers of material, e.g. 12a–12d as illustrated. Adhesive coating 12 serves to more stably bond a working electrode structure 13 ultimately to the electrode substrate 11. Working electrode 13 may be composed of a single thin film metal layer, but preferably includes multiple thin film layers, including at least one conductive (metal) layer and optionally also including one or more non-conductive layers. Illustratively, the working electrode 13 may include layers 13a–13c as shown in FIG. 1. In this regard, it will be understood that the working electrode 13 may contain even more thin film layers. In many applications of the invention, it is expected that the working electrode will include from about 2 to about 50 thin film layers. The preferred electrode device 10 also includes barrier layers 14a–14c covering the top and sides of the electrode device. In some embodiments, the device 10 will also include a thermoelectric element 15 in heat transfer relationship with the electrode structure.

Various aspects of electrode devices of the invention, and their fabrication, will now be discussed in greater detail.

As disclosed above, in one aspect, the present invention provides electrode devices that include a copper layer on top of a tantalum nitride/al-tantalum combination adhered to a substrate. In preferred such embodiments, the electrode will comprise the silicon-containing substrate (11), a silicon dioxide layer (12a), a tantalum nitride layer (12b), an α-tantalum layer (12c), a copper layer (12d), and the working electrode and barrier layers 13 and 14. In other aspects of the invention, metals other than copper are bonded to such an underlying structure. Preferred materials for these purposes will be metals that are amenable to deposition as thin films, and which have melting points greater than 150° C. Further, substitutes for copper in this combination preferably minimize the differences between the types of crystalline lattice structures (for example bcc on hcp vs. bcc on bcc), and minimize the differences in the lattice constants, as for example expressed in terms of percent mismatch, with the underlying tantalum layer (desirably α-tantalum). Materials to be deposited atop the tantalum layer will also preferably exhibit thermal expansion characteristics such that the difference in the coefficient of thermal expansion (CTE) between the tantalum layer and the selected metal is no greater than that exhibited by the α-tantalum/copper combination. A further preference exists for metals having an ability to form nitrides or which possess other characteristics indicating electronic and/or chemical compatibility with α-tantalum. Furthermore, for certain electrode applications, the material will be selected for its ability to either absorb hydrogen or deuterium in solution and/or to form hydrides, or in some cases to serve as a diffusion barrier to hydrogen and/or deuterium.

Taking these factors into account, a first group of preferred materials to deposit on top of α-tantalum includes certain metals presenting a lattice constant mismatch less than 11% relative to α-tantalum. Included in this group (Group 1 Copper Substitutes) are the following metals:

Niobium (Nb): Lattice mismatch=0.03%; Fermi Energy difference=0.12

Beta—Titanium (Ti): Lattice mismatch=0.26%; Fermi Energy difference=0.20

Hafnium (Hf): Lattice mismatch=3.15%; Fermi Energy difference=2.10

Tungsten (W): Lattice mismatch=4.12%; Fermi Energy difference=0.60

Molybdenum (Mo): Lattice mismatch=4.67%; Fermi Energy difference=0.70

Zirconium (Zr): Lattice mismatch=5.72%; Fermi Energy difference=0.70

Nickel (Ni): Lattice mismatch=6.75%; Fermi Energy difference=2.20

Erbium (Er): Lattice mismatch=7.78%; Fermi Energy difference=0.70

Vanadium (V): Lattice mismatch 8.22%; Fermi Energy difference=1.10

Dysprosium (Dy): Lattice mismatch=8.84%; Fermi Energy difference=0.59

Samarium (Sm): Lattice mismatch=9.68%; Fermi Energy difference=0.40

Gadolinium (Gd): Lattice mismatch=10.14%; Fermi Energy difference=2.16

Neodymium (Nd): Lattice mismatch=10.80%; Fermi Energy difference=0.29

Another set of preferred metals for deposition atop of α-tantalum present a lattice constant mismatch from 11 to 21% relative to α-tantalum. These preferred metals are either normally in bcc/ccp structure or wherein a bcc/fcc/ccp/bct allotrope is known. Additionally, these metals are known to form nitrides. This group of metals (Group 2 Copper Substitutes) includes the following:

Chromium (Cr): Lattice mismatch=11.85%; Fermi Energy difference=1.72

Iron (Fe): Lattice mismatch=13.17%; Fermi Energy difference=5.90

Cobalt (Co): Lattice mismatch=14.28%; Fermi Energy difference=1.00

Rhodium (Rh): Lattice mismatch=15.21%; Fermi Energy difference=1.10

Iridium (Ir): Lattice mismatch=16.29%; Fermi Energy difference=1.10

Rhenium (Re): Lattice mismatch=16.37%; Fermi Energy difference=?

Osmium (Os): Lattice mismatch=17.17%; Fermi Energy difference=1.10

Palladium (Pd): Lattice mismatch=17.85%; Fermi Energy difference=0.90

Ruthenium (Ru): Lattice mismatch=18.04%; Fermi Energy difference=1.20

Platinum (Pt): Lattice mismatch=18.87%; Fermi Energy difference=0.70

It will be recognized that the Group 1 metals identified above meet selection parameters that are potentially better, or which reasonably approximate, those that characterize the copper/α-tantalum combination. It will also be recognized that the metals in Group 2 above meet parameters that fall only moderately outside the range of those provided by the copper/α-tantalum combination. As those of ordinary skill in the art will appreciate, these substitutes for copper can be incorporated into stable structures utilizing various known techniques in the arts of solid state physics, surface growth phenomena pertaining to metals, and thin film processing and deposition techniques. These metals and techniques may be used without undue experimentation to prepare electrode or other structures having metal interlayers from about 10 Angstroms to several thousand Angstroms thick, composed of TaN/α-Ta/M, where M is a metal other than copper. These preferred structures will exhibit thermodynamic stability within the temperature ranges for operation, and will strongly adhere to silicon-based substrates. Likewise, preferred structures will possess diffusion barrier properties to prevent poisoning of the substrate by the metal deposited atop the α-tantalum.

It is significant that all of the preferred metals listed in Group 1 and Group 2 above display structural allotropy, and the entire range of their structural phase diagrams typically includes several types of bcc, and/or ccb, and/or hcp structures. As those of ordinary skill in the art will recognize, these properties will be considered when selecting sappropriate thin film deposition techniques and conditions to induce growth in one of several alternative structural forms to provide a stable structure on top of an underlying α-tantalum layer. As examples, some of the identified metals normally exhibit an hcp structure at room temperature, e.g., Co, Nd, Re, Os, and Ru. Nonetheless, one practiced in the area can first select one of these preferred materials, and then use thin film deposition techniques and conditions appropriate to manipulate film growth conditions to deposit a bcc, fcc, ccp or other closely-matched psuedomorphic structure atop the α-tantalum. These and other design strategies can be used to minimize effective lattice mismatches, create sharp interfaces between metal layers, and achieve desired stability in the finished construct.

Multilayer electrodes of the invention can be of any suitable shape. For example, they may include planar or curvilinear structures, provided on a single, monolithic structure or on multiple structures such as pellets or beads of spherical or other shapes. The electrodes are created by depositing multiple sequential thin film layers of selected materials on top of insulating, preferably silicon-containing substrates. In use, these electrodes will be subjected to substantial heat and thermal cycling stresses, for example as a result of ohmic heating from the passage of current through the electrode materials and/or exothermic reactions. Under typical operating conditions, thin film electrodes of the invention will be expected to operate at temperatures ranging from about 100° C. to about 300° C. when using aqueous electrolytes, and from about 300° C. to about 1,000° C. or more for other systems such as gas-phase systems, molten salt electrolytes, or "dry" electrolytes using solid metal hydrides.

Preferred electrodes of the invention will also be constructed so as to avoid substantial interdiffusion of materials between thin film interfaces. For these purposes, preferred electrodes will be design to avoid prolonged operation at temperatures higher than about ⅔ of the melting point of the material with the lowest melting point in the thin film structure. Considering expected, typical operating temperatures, preferred metals for incorporation in thin films of electrodes of the invention will have melting points greater than about 150° C. This design feature is illustrated in the following table, which suggests subsets of materials for multi-layer thin film electrodes that are desirable for use in applications sustaining a given maximum operating temperature.

TABLE 1

| If the maximum expected sustained operating temperature of a commercial multilayer thin film electrode taught by the Invention is: | Then the lowest melting point of any thin film material or substrate used in that specific electrode should be greater than or equal to approximately: | Which in turn suggests the following lists of preferred thin film materials for multilayer electrodes designed for use at the indicated maximum sustained operating temperatures: |
|---|---|---|
| 100° C. | 150° C. | Ag, Al, Au, Ba, Be, Ce, Co, Cr, Cu, Dy, Er, Fe, Gd, Hf, Ir, Mg, Mo, Nb, Nd, Ni, Os, Pd, Pt, Re, Rh, Ru, Sm, Ta, Th, Ti, Tl, U, V, W, Zr |
| 200° C. | 300° C. | Ag, Al, Au, Ba, Be, Ce, Co, Cr, Cu, Dy, Er, Fe, Gd, Hf, Ir, Mg, Mo, Nb, Nd, Ni, Os, Pd, Pt, Re, Rh, Ru, Sm, Ta, Th, Ti, Tl, U, V, W, Zr |
| 300° C. | 448° C. | Ag, Al, Au, Ba, Be, Ce, Co, Cr, Cu, Dy, Er, Fe, Gd, Hf, Ir, Mg, Mo, Nb, Nd, Ni, Os, Pd, Pt, Re, Rh, Ru, Sm, Ta, Th, Ti, U, V, W, Zr |
| 400° C. | 600° C. | Ag, Al, Au, Ba, Be, Ce, Co, Cr, Cu, Dy, Er, Fe, Gd, Hf, Ir, Mg, Mo, Nb, Nd, Nl, Os, Pd, Pt, Re, Rh, Ru, Sm, Ta, Th, Ti, U, V, W, Zr |
| 500° C. | 750° C. | Ag, Au, Be, Ce, Co, Cr, Cu, Dy, Er, Fe, Gd, Hf, Ir, Mo, Nb, Nd, Ni, Os, Pd, Pt, Re, Rh, Ru, Sm, Ta, Th, Ti, U, V, W, Zr |
| 600° C. | 900° C. | Ag, Au, Be, Co, Cr, Cu, Dy, Er, Fe, Gd, Hf, Ir, Mo, Nb, Nd, Ni, Os, Pd, Pt, Re, Rh, Ru, Sm, Ta, Th, Ti, U, V, W, Zr |
| 700° C. | 1045° C. | Au, Be, Co, Cu, Dy, Er, Fe, Gd, Hf, Ir, Mo, Nb, Ni, Os, Pd, Pt, Re, Rh, Ru, Sm, Ta, Th, Ti, U, V, W, Zr |
| 800° C. | 1194° C. | Co, Cr, Dy, Er, Fe, Gd, Hf, Ir, Mo, Nb, Ni, Os, Pd, Pt, Re, Rh, Ru, Ta, Th, Tl, V, W, Zr |
| 900° C. | 1343° C. | Co, Cr, Dy, Er, Fe, Hf, Ir, Mo, Nb, Nl, Os, Pd, Pt, Re, Rh, Ru, Ta, Th, Ti, V, W, Zr |
| 1000° C. | 1493° C. | Co, Cr, Er, Fe, Hf, Ir, Mo, Nb, Os, Pd, Pt, Re, Rh, Ru, Ta, Th, Ti, V, W, Zr |

In summary, the following factors may be considered when selecting metals as substitutes for copper for deposition on top of α-tantalum in electrode structures of the invention:

The preference for creating multilayer thin film electrodes that can function at higher sustained operating temperatures than would be permitted by copper according to the ⅔ M.P. rule, and/or The preference for significantly different Fermi energies between the copper substitute material and between the copper substitute material and the substrate, and/or The desire to maximize or minimize the absorption or "gettering" of hydrogen and/or deuterium in solution by the thin film layer substituting for copper above the α-Ta, and/or The desired to create a barrier to the diffusion of hydrogen atoms or ions into the tantalum layers just above the substrate, and/or The desire to promote formation of metal hydrides in the copper substitute thin film layer "on top" of tantalum under specified operating conditions and temperatures, and/or The preference for optimizing matching of the coefficients of thermal expansion of the copper substitute thin film layer to the tantalum "below", and/or The preference for optimizing matching of lattice structures and lattice constants to minimize strain between the copper substitute layer and α-Ta. Same or similar lattice structures and reasonably similar lattice constants, along with compatible chemical characteristics and use of various types of known thin film processing and deposition techniques, can enable strong adhesion and sharp as possible interfaces between the copper substitute material and α-Ta as well as provide acceptable thermal stability within an electrode's planned range of sustained operating temperatures.

The ability of the copper substitutes to serve as interlayerso that permit the deposition of other thin film materials in "upper" layers in the multilayer thin film structure comprised in a given electrode, which could not otherwise be deposited directly on top of either tantalum or copper with adequate adhesion and bonding for use in a particular application.

The ability of the copper substitute to permit creation of multilayer thin film electrodes that incorporate magnetoresistive spin valves (alternating magnetic and non-magnetic thin film layers, e.g. Co/Pd or Co/Cu) or tunneling junctions (alternating conducting magnetic and insulating non-magnetic thin film layers)

Regarding the overall design of multi-layer electrode structures of the invention, one skilled in the art will recognize that some empirical testing may be necessary in selecting appropriate metals, deposition and processing techniques. In doing so, those of ordinary skill in the art will take into account the following factors:

Achieving sharp interfaces between materials with as little alloying and/or interdiffusion as possible, i.e. trying to create abrupt interfaces between thin film layers.

Trying to minimize lattice mismatch between thin film layers with respect to compatible lattice structures (e.g. bcc with bcc versus bcc with hcp) and reasonable matching of lattice constants. All other things being equal, it is known that structural stability of a thin film interface is much more likely, but not guaranteed, if the lattice mismatch at the interface is as small as possible, which minimizes destabilizing stresses in adjacent thin film layers.

Trying to harmonize chemical/electronic characteristics between materials as much as possible (e.g. all other things being equal, other metals that easily form nitrides, as does tantalum, would tend to be compatible with tantalum) to maximize chemical aspects of adhesion to α-tantalum.

Selecting correctly from a variety of different deposition, alternative triggered growth modes, and processing techniques (e.g. choosing between conventional sputtering versus molecular beam epitaxy for deposition, or vacuum annealing versus annealing under a gas between steps) to choose the right technique for a particular combination of electrode materials and specific application requirements that can achieve the desired results. For example, use of known surfactants during surface film growth can improve epitaxy and resulting adhesion.

Selecting combinations of thin film materials in order to incorporate other particular desired properties and/or requirements such as: melting point, Fermi Energy differences, solubility of hydrogen and/or deuterium, conductivity, coefficient of thermal expansion, ferromagnetic or antiferromagnetic layers, in a given electrode design.

Selecting combinations of thin film materials with properties that collectively possess sufficient thermal, structural, chemical, and thermodynamic stability within the anticipated range of sustained operating temperatures for a given electrode application, to be most useful.

Use of ultra-thin interlayers (also called "buffer layers"; these may have a thickness ranging from several monolayers up to approximately 30 atomic monolayers of a material) as a "work around" technique, where necessary, to promote abrupt interfaces between specific thicker interlayers of other thin film materials (ranging from approximately 100 Angstroms up to several thousand Angstroms in thickness) that would otherwise be less compatible when in direct contact with each other. For example, it is a known practice that structural strain can be reduced by creating a multilayer structure that incorporates an ultra-thin, compatible interlayer with a lattice constant that is intermediate between two other materials.

Processing and/or polishing of electrode surfaces prior to, and/or during, and/or between deposition and film growth steps to control surface roughness to achieve optimal surface smoothness.

To accomplish these goals, those skilled in the art have an array of deposition and processing techniques that may be utilized. For example, these may include:

Sputter Deposition: and other types of Physical Vapor Deposition (PVD) such as evaporation Chemical Vapor deposition (CVD): includes Low Pressure CVD, Plasma Enhanced CVD, Metalorganic CVD (MOCVD), Ultrahigh Vacuum CVD (UHV CVD), and metalorganic atomic layer deposition (MOALD)

Epitaxial Deposition: Molecular Beam Epitaxy (MBE) such as Vapor Phase Epitaxy (VPE); MBE is particularly attractive for metals such as Cu and the Cu substitutes noted above, because MBE can provide hetero-epitaxy at temperatures close to room temperature, thus virtually eliminating the problem of interdiffusion at thin film interfaces during electrode fabrication. One other advantage is that many epitaxial techniques can achieve very high growth rates of material.

Electroplating or Electrodeposition (ED): ED is known to be a particularly good technique for copper, gold, and nickel and other noble metals. It is known that copper can be electroplated on top of a PVD copper seed layer.

Electroless Plating Deposition: plating of metals on metals via an aqueous, autocatalytic chemical reduction reaction that does not require external applied current like electroplating. Working temperatures are 30° to 80° C.; coverage is not sensitive to substrate geometry; and the process deposits dense thin films having little or no stress. Known to be especially good for depositing metals such as Cu, Ni, Pd, Ni on Al, Cu on Ni on Ti, Au, Rh, Ag, Co, and Fe.

Displacement Plating Deposition: after deposition of a sufficiently thick layer of a first metal (e.g. copper) on an electrode, it is immersed in a bath containing dissolved ions of a metal more noble than the deposited metal (copper) such as Ag, Au, Pt, Pd, Rh, Ir, Re, Os, and Ru. Upon simple immersion, the surface of the deposited metal (copper) film dissolves (oxidizes) and the selected metal then deposits (reduces) on top of the originally-deposited metal (copper). This process is self-limiting, and typically produces a deposited film just several monolayers thick, which is ideal for triggering psuedomorphic growth of thin films on metals with relatively large lattice mismatches.

Thermal Growth or Oxidation: oxidation of substrate surface in oxygen-rich atmosphere Annealing: modification of film surface structural properties via heating, recrystallization, and cooling under various levels of vacuum and/or under specific gases and air at various partial pressures and elevated temperatures to reduce lattice strain, control grain size, control statistical distribution of grain sizes, and modify properties of grain boundaries.

Creation of thin films from metal alloy targets: this technique takes advantage of the fact that PVD magnetron sputtering can deposit thin films on substrates that are essentially compositionally identical to targets comprised of simple or complex alloys. This can be utilized as a deliberate fabrication strategy to: (1) modify the effective lattice constant of the thin film to reduce mismatches in lattice constants compared to pure materials, and/or (2) create thin film layers in a complex multilayer heterostructure with special physical properties. With regard to changing the effective lattice constant by deliberate use of an alloy target, Vegard's Law can be used as an approximation, which for a binary alloy of metals A and B is of the form: $a_0(x)=a_A(1-x)+a_B x$ where $a_0(x)$ is the lattice constant of $A_{1-x}B_x$. For a ternary alloy, the equation expressing Vegard's Law uses simple linear interpolation to yield a more complex form that is described along with supporting references in Herman, M. A., "Silicon-Based Heterostructures: Strained-Layer Growth by Molecular Beam Epitaxy", *Cryst. Res. Technol.*, 34, 1999, 5–6, 583–595. In many cases, deviations of predicted effective lattice constants from the law are not huge, i.e. on the order of 3%. Regarding special physical properties: for example, for certain applications of the invention, it may be desirable to incorporate "upper", thin film layers that possess special magnetic or electronic properties. Examples of such alloys are: cobalt/rhenium bilayers (giant magnetoresistance); NiFe, CoFe, CoZrTa, CoNb, CiZrNb, FeAl, FeTa, and FeZr (ferromagnetic); PtMn (antiferromagnetic); CoPt and FePt (large anisotropy constants); $UAl_2$ (older type of nuclear reactor fuel); $U_6Fe$, $UPt_3$ $CePd_3$, and a variety of related heavy electron compounds (for an excellent overview see: Degiorgi, L., "The electrodynamic response of heavy-electron compounds", *Reviews of Modern Physics*, 1999, 71, 3, 687–734.) Also, spin valve structures can be incorporated in "upper" layers of electrodes of the invention, such structures being comprised by pairs of ferromagnetic layers (e.g. Co) separated by a nonmagnetic conducting film such as Cu or Pd, creating an intermediate Co/Cu/Co/Cu . . . or Co/Pd/Co/Pd . . . structure in "upper" layers of an electrode taught by the Invention. Such spin valve structures can be incorporated in an electrode using the methods disclosed herein relating to materials selection, deposition, and processing. Spin valve or any other layered structures with special properties may comprise some or all of the "upper" layers of an electrode taught by the Invention. Ion implantation and/or rapid solidification can also be used to create unusual alloys that contain ". . . nano-sized inclusions of elements that are [normally] insoluble in the matrix." This strategy can be used to fabricate electrodes using metals that form relatively few compatible pairs with other metals. Such metals include: Be, Ce, Mg, Th, and Tl. As an example of the application of this strategy, it is known that thallium (Tl—normally hcp) can be implanted into aluminum (Al) as sub-10 nm inclusions that adopt the fcc structure of the aluminum matrix (see: Johnson, E., "Multiphase and Multicomponent Nanoscale Inclusions in Aluminum", *Philosophical Magazine Letters*, 1993, 68, 131–135).

Heteroepitaxial Multilayer Growth: Broadly speaking, this electrode thin film fabrication strategy involves deliberate triggering of strained and/or psuedomorphic growth during deposition. For any two metals A and B, epitaxial growth of B on top of A can create a strained and/or psuedomorphic regime in which B adopts the in-plane lattice spacing of A. Elastic energy is accumulated up to a critical thickness for which plastic relaxation takes place, which is typically accompanied by a change in the growth mode. By selecting the appropriate deposition technique to control the volume fraction and/or total thickness of each A and B layer (measured in terms of atomic monolayers), different structural phases of copper substitute materials (Groups 1 and 2 above) can be stabilized. Known examples of such strained or psuedomorphic structural transitions include hcp to bcc in Zr, bcc to hcp in Nb, fcc to hcp in Al, and hap to fcc in Ti. For example, it is known that fcc Ti can be grown successfully on top of fcc Al(100) surfaces in films up to 5 monolayers thick, in spite of a 22% lattice mismatch "on paper" (see. Smith, R. J. et al, "Growth of thin Ti films on Al single-crystal surfaces at room temperature", *Surface and Interface Analysis*, 1999, 27, 185). As a further example., it is known that Fe can be deposited on top of an Au(111) surface. Experimental data suggests that Fe grows as fcc structures on Au(111) surfaces for the first three monolayers and then changes into the bcc structure in additional "upper" layers of Fe. These examples illustrate a fabrication strategy in which structures of Preferred Copper Substitute thin film materials being deposited on top α-Ta can be manipulated in a predictable fashion by controlling the number of atomic monolayers laid down upon the α-Ta surface and then stopping deposition prior to accumulating enough monolayers to change the psuedomorphic or strained structure.

Use of Atomic Surfactants: this technique uses a third atomic species (that is not being deposited on, or being incorporated in, a surface) to mediate the growth of a metal B being deposited on top of another metal A.

Properly selected surfactants encourage surface "wetting" and orderly 3D layer-by-layer growth rather than the formation of 2D and 3D "islands" (Volmer-Weber growth) of the metal that is being deposited on the surface of A. It is desirable to avoid islanding during deposition and surface growth if possible, because it can lead to strain-enhanced diffusion (which reduces the "sharpness" of the interface between A and B) and/or create defects and dislocations that can weaken structural integrity and adhesion at the interface. Surfactants achieve their effect by lowering the surface energies of both A and B during deposition. This technique is well described by Herman, M. A. in the paper, "Silicon-Based Heterostructures: Strained-Layer Growth by Molecular Beam Epitaxy", *Cryst. Res. Technol.*, 34, 1999, 5–6, 583–595.

Additional aspects of the present invention relate to electrode constructs including a copper layer, optionally itself atop a tantalum nitride/α-tantalum combination, also including at least one and preferably several metal layers deposited on top the copper layer. Similar to the selection of copper substitutes as disclosed above, those skilled in the art may consider the following factors when selecting a metal for deposition on top of copper:

Preferred materials will allow deposition as thin films through some known deposition technique and method, and Candidate materials will preferably have melting points greater than 150° C., and Candidate materials will be chosen where possible to minimize the differences between types of crystalline lattice structures (e.g. bcc on hcp versus bcc on bcc), and relative values of lattice constants expressed in terms of % mismatch, in comparison to those of copper, and Candidate materials for deposition on top of copper will preferably not have differences in coefficients of thermal expansion ("CTE") in comparison to copper that are larger than the difference in CTE between α-tantalum and copper, and Preferred materials will have the ability to form nitrides, indicating some chemical compatibility with copper, and In some electrode applications, a candidate material desirably have the ability to either absorb hydrogen/deuterium in solution and/or form hydrides, or serve as a diffusion barrier to hydrogen/deuterium.

Using the above criteria, the following metals constitute a preferred group for deposition on top of copper, presenting a lattice constant mismatch of less than 11%. In addition, in each case the metal is either normally in bcc/ccp structure or a bcc/fcc/ccp/bct allotrope is known, and the metals are known to form nitrides. In the following list (Group I), the percent lattice mismatch and the Fermi energy difference are given in relation to copper.

Samarium (Sm): Lattice mismatch=0.17%; Fermi Energy difference=1.40

Gadolinium (Gd): Lattice mismatch=0.58%; Fermi Energy difference=0.36

Dysprosium (Dy): Lattice mismatch=0.61%; Fermi Energy difference=1.21

Neodymium (Nd): Lattice mismatch=1.19%; Fermi Energy difference=1.51

Erbium (Er): Lattice mismatch=1.57%; Fermi Energy difference=1.10

Nickel (Ni): Lattice mismatch 2.51%; Fermi Energy difference=0.40

GamGa-Uranium (U): Lattice mismatch=4.01%; Fermi Energy difference=3.50

Thallium (Tl): Lattice mismatch=5.21%; Fermi Energy difference=1.15

Rhodium (Rh): Lattice mismatch=6.75%; Fermi Energy difference=0.70

Iridium (Ir): Lattice mismatch=6.20%; Fermi Energy difference=0.70

Palladium (Pd): Lattice mismatch=7.63%; Fermi Energy difference=0.90

Beta—Titanium (Ti): Lattice mismatch=8.43%; Fermi Energy difference=1.60

Platinum (Pt): Lattice mismatch 8.56%; Fermi Energy difference=1.10

Niobium (Nb): Lattice mismatch=8.70%; Fermi Energy difference=1.68

Again, using the considerations above and selecting metals that have a lattice constant mismatch of 11% to 21% relative to copper, the following metals constitute a second preferred group (Group II) for deposition atop of copper:

Magnesium (Mg): Lattice mismatch=11.22%; Fermi Energy difference=0.08

Hafnium (Hf): Lattice mismatch=11.58%; Fermi Energy difference=0.30

Aluminum (Al): Lattice mismatch=12.02%; Fermi Energy difference=4.70

Gold (Au): Lattice mismatch=12.82%; Fermi Energy difference=1.87

Molybdenum (Mo): Lattice mismatch=12.94%; Fermi Energy difference=1.10

Silver (Ag): Lattice mismatch=13.01%; Fermi Energy difference=1.51

Vanadium (V): Lattice mismatch=16.18%; Fermi Energy difference=0.70

Iron (Fe): Lattice mismatch 20.70%; Fermi Energy difference=4.10

As disclosed above, the working electrode will preferably includes a plurality of thin metal films, including at least two different types of metals. These multi-layer working electrodes can be relatively simple or comparatively complex, and advantageously will be characterized by a specific sequence of thin metal layers. The particular set or sequence of thin metal layers selected for the working electrode will depend upon several factors including, for example, the overall physical, electrochemical, and electronic characteristics desired for a particular electrode application. Parameters that may be considered in this regard include the need to survive particular sustained operating temperatures, the need to maximize hydrogen or deuterium loading rates or levels, resistance to hydrogen embrittlement, the incorporation of intermediate ferromagnetic or anti-ferromagnetic layered structures, the incorporation of intermediate heavy electron structures, and the like. Using these and other parameters, the following table sets forth metal-metal combinations which are expected to be preferred. In particular, the left column of the table shows a given metal material, the center column shows a first group of combinations with that metal material wherein the percent lattice constant mismatch among the two metals is less than 11%, and the right column shows a second group of metals wherein the lattice constant mismatch among the two metals is between 11% and 21%.

TABLE 2

| Preferred Material | Numbers of Pairs (I, II, total) | Group I Combinations With Preferred Material (blue color on chart) | Group II Combinations With Preferred Material (salmon color on chart) |
|---|---|---|---|
| Ag (Silver) | (4, 9, 13) | Al, Au, Pd, Pt, | Cu, Dy, Er, Gd, Nd, Ni, Sm, Tl, γ-U |
| Al (Aluminum) | (2, 3, 5) | Ag, Au | Cu, Tl, γ-U |
| Gold (Au) | (6, 10, 16) | Ag, Al, Ir, Pd, Pt, Rh | Cu, Dy, Er, Gd, Nd, Ni, Sm, Th, γ-U, Zr |
| Be (Beryllium) | (0, 3, 3) | None | Os, Re, Ru |
| Ce (Cerium) | (1, 0, 1) | Th | None |
| Co (Cobalt) | (6, 6, 12) | Cr, Fe, Os, Re, Ru, V | Hf, Mo, Nb, α-Ta, β-Ti, W |
| Cr (Chromium) | (9, 6, 15) | Fe, Hf, Mo, Os, Re, Ru, V, W | Nb, α-Ta, Ti, Tl, γ-U, Zr |
| Cu (Copper) | (16, 6, 24) | Dy, Er, Gd, Ir, Nb, Nd, Ni, Pd, Pt, Rh, Sm, α-Ta, β-Ti, Tl, γ-U, Zr | Ag, Al, Au, Hf, Mg, V |
| Dysprosium (Dy) | (15, 6, 21) | Cu, Er, Gd, Ir, Nb, Nd, Ni, Pd, Pt, Rh, Sm, α-Ta, β-Ti, γ-U, Zr | Ag, Au, Hf, Mo, V, W |
| Erbium (Er) | (16, 6, 22) | Cu, Dy, Gd, Ir, Mg, Nb, Nd, Ni, Pd, Pt, Rh, Sm, α-Ta, β-Ti, γ-U, Zr | Ag, Au, Hf, Mo, V, W |
| Fe (Iron) | (8, 4, 12), | Co, Cr, Mo, Os, Re, Ru, V, W | Hf, Nb, α-Ta, β-Ti |
| Gadolinium (Gd) | (15, 6, 21) | Cu, Dy, Er, Ir, Nb, Nd, Ni, Pd, Pt, Rh, Sm, α-Ta, β-Ti, γ-U, Zr | Ag, Au, Hf, Mo, V, W |
| Hafnium (Hf) | (9, 12, 21) | Cr, Mo, Nb, Ni, α-Ta, β-Ti, V, W, Zr | Co, Dy, Er, Fe, Ir, Gd, Nd, Os, Re, Rh, Ru, Sm |
| Ir (Iridium) | (12, 4, 16) | Au, Cu, Dy, Er, Gd, Nd, Ni, Pd, Pt, Rh, Sm, Zr | Mo, Nb, α-Ta, β-Ti |
| Mg (Magnesium) | (2, 1, 3) | Tl, γ-U | Cu |
| Mo (Molybdenum) | (9, 11, 20) | Cr, Fe, Hf, Nb, α-Ta, β-Ti, V, W, Zr | Co, Dy, Er, Gd, Nd, Ni, Os, Re, Rh, Ru, Sm |
| Nb (Niobium) | (14, 9, 23) | Cu, Dy, Er, Gd, Hf, Mo, Nd, Ni, Sm, α-Ta, β-Ti, V, W, Zr | Co, Cr, Fe, Ir, Os, Pd, Pt, Re, Rh |
| Nd (Neodymium) | (21, 6, 27) | Cu, Dy, Er, Gd, Nd, Ni, Pd, Pt, Rh, Sm, Ir, Nb, Ni, Pd, Pt, Rh, Sm, α-Ta, β-Ti, γ-U, Zr | Ag, Au, Hf, Mo, V, W |
| Ni (Nickel) | (15, 6, 21) | Cu, Dy, Er, Gd, Hf, Ir, Nb, Nd, Pd, Rh, Sm, α-Ta, β-Ti, γ-U, Zr | Ag, Au, Mo, Pt, V, W |
| Os (Osmium) | (6, 6, 12) | Co, Cr, Fe, Re, Ru, V | Be, Mo, Nb, α-Ta, W, Zr |
| Pd (Palladium) | (12, 5, 17) | Ag, Au, Cu, Dy, Er, Gd, Ir, Nd, Ni, Pt, Rh, Sm | Nb, α-Ta, β-Ti, γ-U, Zr |
| Pt (Platinum) | (11, 6, 17) | Ag, Au, Cu, Dy, Er, Gd, Ir, Nd, Pd, Rh, Sm | Nb, Ni, α-Ta, β-Ti, γ-U, Zr |
| Re (Rhenium) | (6, 7, 13) | Co, Cr, Fe, Os, Ru, V | Be, Hf, Mo, Nb, α-Ta, β-Ti, W |
| Rh (Rhodium) | (13, 6, 19) | Au, Cu, Dy, Er, Gd, Ir, Nd, Ni, Pd, Pt, Sm, γ-U, Zr | Hf, Mo, Nb, α-Ta, β-Ti, W |
| Ru (Ruthenium) | (5, 6, 11) | Co, Cr, Fe, Os, Re | Be, Hf, Mo, Nb, V, W |
| Samarium (Sm) | (13, 4, 17) | Cu, Dy, Er, Gd, Nb, Nd, Ni, Pd, Pt, Rh, Ru, β-Ti, Zr | Hf, Mo, V, W |
| α-Ta (Tantalum) | (14, 9, 23) | Cu, Dy, Er, Gd, Hf, Mo, Nb, Nd, Ni, Sm, β-Ti, V, W, Zr | Co, Cr, Fe, Ir, Os, Pd, Pt, Re, Rh |
| Th (Thorium) | (1, 1, 2) | Ce | Au |
| β-Ti (Titanium) | (15, 8, 23) | Cu, Dy, Er, Gd, Hf, Mo, Nb, Nd, Ni, Sm, α-Ta, γ-U, V, W, Zr | Co, Cr, Fe, Ir, Pd, Pt, Re, Rh |
| Tl (Thallium) | (3, 2, 5) | Cu, Mg, γ-U | Ag, Al |
| γ-U (Uranium) | (10, 6, 16) | Cu, Dy, Er, Gd, Mg, Nd, Ni, Rh, β-Ti, Tl | Ag, Al, Au, Pd, Pt, V |
| V (Vanadium) | (11, 10, 21) | Co, Cr, Fe, Hf, Mo, Nb, Os, Re, α-Ta, β-Ti, W | Cu, Dy, Er, Gd, Nd, Ni, Ru, Sm, γ-U, Zr |
| W (Tungsten) | (9, 11, 20) | Cr, Fe, Hf, Mo, Nb, α-Ta, β-Ti, V, Zr | Co, Dy, Er, Gd, Nd, Ni, Os, Re, Rh, Ru, Sm |
| Zr (Zirconium) | (14, 6, 20) | Dy, Er, Gd, Hf, Ir, Mo, Nb, Nd, Ni, Rh, Sm, α-Ta, β-Ti, W | Au, Cr, Os, Pd, Pt, V |

Given the teachings herein, those skilled in the art will select metal combinations as above, while taking into account additional factors as disclosed herein, including for example, the existence of structural allotropes where necessary to create stable film structures. In addition, with regard to Table 2 above, where iron is used, it is preferably reduced activation martensitic (RAM) F82H steel, which includes 7 to 10% Cr.

When considering the selection of metal combinations for thin film layers, it is also useful to consider, for a particular metal, the total number of combinations providing a lattice constant mismatch less than 21%, the total number of combinations providing a lattice constant mismatch of less than 11%, and the total number of combinations providing a constant mismatch of between 11% and 21%. Table 3 below ranks selected metals in this fashion.

TABLE 3

| Number of Preferred Combinations | Total Number of Preferred Combinations | Total Number of Group I Preferred Combinations | Total Number of Group II Preferred Combinations |
|---|---|---|---|
| 27 | Nd | None | None |
| 26 | None | None | None |
| 25 | None | None | None |
| 24 | Cu | None | None |
| 23 | Nb, α-Ta, β-Ti | None | None |
| 22 | Er | None | None |
| 21 | Dy, Gd, Hf, Ni, V | Nd | None |
| 20 | Mo, W, Zr | None | None |
| 19 | Rh | None | None |
| 18 | None | None | None |
| 17 | Pd, Pt, Sm | None | None |
| 16 | Au, Ir, γ-U | Cu, Er | None |
| 15 | Cr | Dy, Gd, Ni, β-Ti | None |
| 14 | None | Nb, α-Ta, Zr | None |
| 13 | Ag, Re | Rh, Sm | None |
| 12 | Co, Fe, Os, | Ir, Pd | Hf |
| 11 | Ru | Pt, V | Mo, W |
| 10 | None | γ-U | Au, V |
| 9 | None | Cr, Hf, Mo, W | Ag, Nb, α-Ta |
| 8 | None | Fe | β-Ti |
| 7 | None | None | Re |
| 6 | None | Au, Co, Os, Re | Co, Cr, Cu, Dy, Er, Gd, Nd, Ni, Os, Pt, Rh, Ru, γ-U, Zr |
| 5 | Al, Tl | Ru | Pd |
| 4 | None | Ag | Fe, Ir, Sm |
| 3 | Be, Mg | Tl | Al, Be |
| 2 | Th | Al, Mg | Tl |
| 1 | Ce | Ce, Th | Mg, Th |
| 0 | None | Be | Ce |

It is noted from Table 3 above that neodymium forms more Group I combinations (lattice constant mismatch less than 11%) than any other of the identified metals. Copper and erbium both form the second-largest number of Group I combinations, underscoring copper's advantageous use as a layer, including an underlying base layer, in thin film structures.

In terms of total number of combinations (Group I plus Group II), neodymium is preferred, followed by copper, with the next tier including niobium, α-tantalum, and β-titanium. There is also a large cluster of fourteen elements that form six Group II combinations.

In addition, with respect to the total number of combinations (Group I plus Group II), the selected metals identified cluster into two broad assemblages separated by a relatively wide gap (from 6 to 10 total combinations). Thus, in terms of total combinations, those metals identified in Table 3 above occurring in the first assemblage, having nine or more total combinations (Group I+Group II), form an additional preferred set of materials for use in the invention.

In certain applications, electrodes of the invention will be loaded with hydrogen isotopes such as hydrogen, deuterium or tritium, when used in electrochemical cells or otherwise. In these applications it will also be common to operate the electrodes at elevated temperatures in steady-state hydrogen/metal loading ratios that can reach 100 atomic % hydrogen/metal for some transition metals and as high as 200 to 300 atomic % hydrogen/metal for materials such as thorium and rare earth metals such as cerium and neodymium. Hydrogen loading will commonly involve the dissociation of hydrogen or deuterium molecules at the surface of the metals, after which hydrogen or deuterium atoms dissolve exothermally or endothermally, and diffuse into interstitial sites within the metal lattice as a solid solution. Thereafter, distinct metal hydride phases are formed. This deliberate electrochemical loading of hydrogen or deuterium or tritium into thin film lattices of electrodes of the invention can affect the structural, electronic and thermodynamic stabilities of multi-layer thin film electrodes, particularly at interfaces between metals.

For example, for many metals, within any given structural phase, lattice constants tend to increase (e.g. roughly linearly) and parallel with high hydrogen or deuterium loading ratios. In some cases, however, when a structural phase shift point is reached, the values of the lattice constant for a given metal can change relatively abruptly, for instance, at the onset of hydride formation. Thus, when adjacent metal layers have significantly different solubility/diffusivity with respect to hydrogen isotope uptake and differing phase diagrams, structural problems can arise at metal interfaces. For example, problems may occur when otherwise acceptably matched lattice constants for two different metals at a thin film interface change at radically different rates during the loading process. This may eventually result in a lattice constant mismatch that is unacceptably high, which in turn may compromise adhesion and stability of thin film interfaces when a desired, steady-state hydrogen/metal ratio and temperature are reached.

Table 4 below sets forth calculated percent changes in the total volume of a metal as a result of increases in the lattice constant for a hypothetical cubic lattice structure. These values may be used as a guide by those skilled in the art when evaluating metals for incorporation into working thin film electrodes of the invention.

TABLE 4

| % Increase in Lattice Constant a | % Increase in Total Volume of Structure |
|---|---|
| 1% | 3% |
| 2 | 5 |
| 3 | 9 |
| 4 | 12 |
| 5 | 16 |

TABLE 4-continued

| % Increase in Lattice Constant a | % Increase in Total Volume of Structure |
|---|---|
| 6 | 19 |
| 7 | 23 |
| 8 | 26 |
| 9 | 30 |
| 10 | 33 |
| 11 | 37 |
| 12 | 40 |

As noted above, hydrogen loading can also cause significant alteration of a metal's structural space group and/or lattice packing arrangement. These changes may significantly impact adhesion and stability of thin film interfaces.

Loading of hydrogen isotopes and metals may also in some cases cause embrittlement, which involves a significant reduction in the structural integrity of specific metals, sometimes manifested by the development of macroscopic stress-related cracks, avoid formation, blistering, or fracturing along grain boundaries. Loss of mechanical strength and structural failure may result.

The change in lattice constant experienced for a given level of hydrogen isotope loading may be measured empirically or estimated based upon data for other similar metals. For most metals, it is expected that the percent increase in lattice constant of simpler hydrides of the form in $M_yH_x$ may not substantially exceed values of about 4% to 7% for loading ratios that finally saturate at values well below 1.5. This range includes the likely maximum hydrogen isotope/metal ratios for a number of preferred metals herein including palladium (which at maximal loading has a hydrogen/metal ratio of approximately 1), titanium, and 7 out of the 8 phases of Niobium. Niobium's and Zirconium's δ-phases maximize at a hydrogen/metal ratio of nearly 2. As to more complex hydrides, lattice constants may increase non-linearly above hydrogen isotope/metal loading ratios above about 1.2, for example, in the case of certain hydrides of the form $M1_yM2_zH_x$, where M1 and M2 are metals.

Thus in summary to mitigate against potentially negative effects of hydrogen isotope loading, those skilled in the art may consider the following factors.

1. For each metal under consideration, an ordinarily skilled practitioner of the art could examine the following data:

Hydrogen/Deuterium solubility/permeability/diffusivity, coefficient of thermal expansion ("CTE") at various temperatures, phase diagrams with respect to M/H or M/D ratios, desired lattice structure that will be deliberately induced during thin film deposition, and lattice constantts) associated with a material's structure prior to hydrogen loading, and then 2. Select specific combinations of Group I and Group II metals across interfaces so that: independent of, and prior to, satisfying other design goals (such as maximizing differences in Fermi Energies between thin film layers of the electrode), materials with significantly higher affinity for dissolving hydrogen and/or forming hydrides are combined with different preferred materials in adjacent thin film layers (on either side of the interface) that preferably have: (a) lower affinity for dissolving hydrogen/deuterium and/or forming hydrides, and (b) lattice constants prior to H or D loading that are significantly larger (i.e., on the order of at least 3% to 6% larger for many alternative combinations of preferred metals) than those of the metal with the higher tendency to dissolve hydrogen and/or form hydrides, and if possible also (c) CTEs that are also no worse than nearly equal to but preferably larger than those of the preferred material with a greater tendency to dissolve hydrogen and/or form hydrides. This method will enable preferred materials to be selected and combined in a manner such that relative lattice mismatches (based upon structural factors and CTEs) between adjacent thin film layers would not get significantly worse and in some cases would actually improve (i.e. % mismatch would be reduced) as the material undergoes dynamic hydrogen and/or deuterium loading in an electrochemical cell during the process of reaching a target operating temperature, and then 3. Determine the likely range of operating temperatures for a given electrode design. Examine the degree of synchronization of phase diagrams between adjacent thin film Layers of preferred materials with respect to temperature. Based on this analysis, create a finalized list of preferred combinations of alternative preferred materials that minimizes relative structural changes between thin film layers as a result of temperature and pressure effects.

Figure 2:
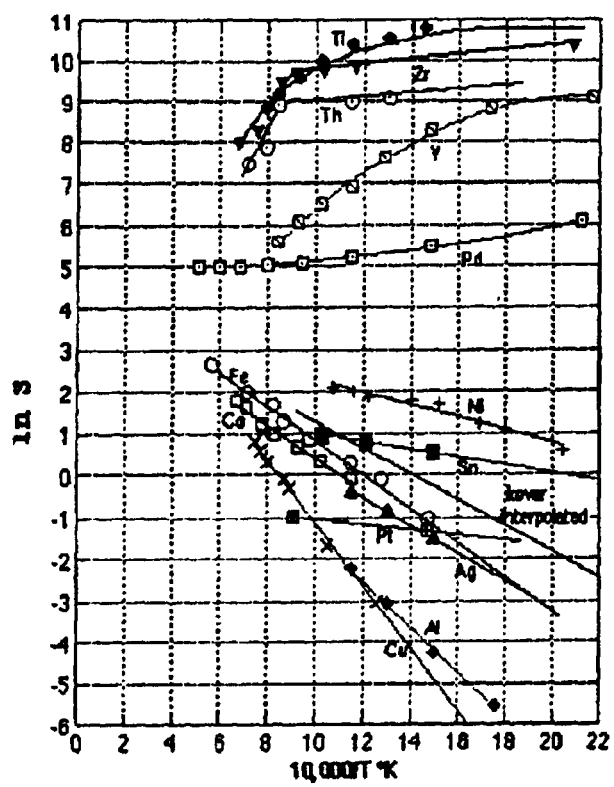
FIG. 2 is a graph showing the relative solubility of hydrogen in various metals.
Figure 3:
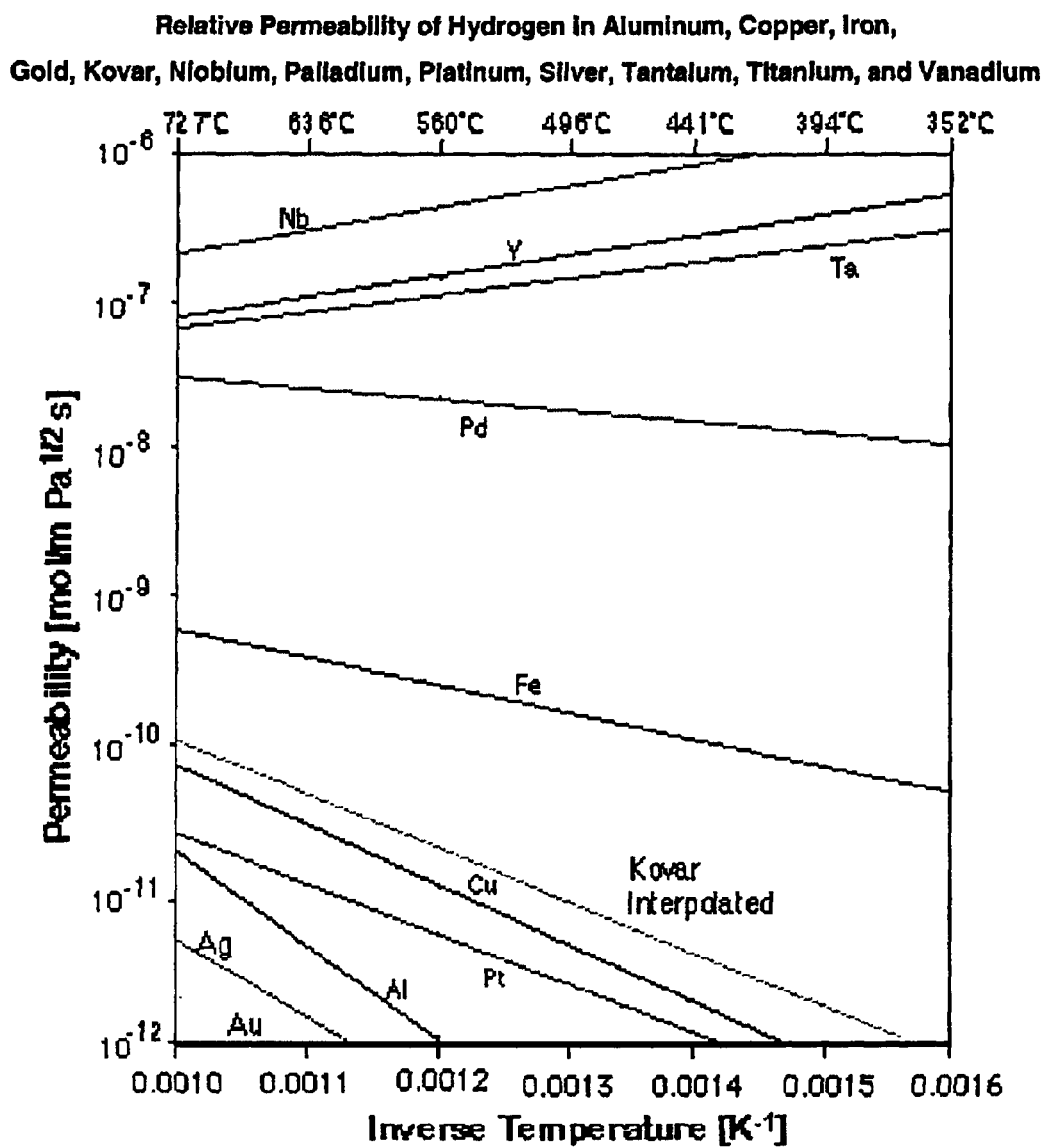
FIG. 3 is a graph showing the relative permeability of hydrogen in various metals.

FIGS. 2 and 3 and Table 5 below set forth hydrogen solubility and hydrogen permeability for selected preferred materials for use in working electrode layers of the invention, and are illustrative of the types of data utilizable by those skilled in the art in preparing multi-layer thin film electrodes of the present invention.

TABLE 5

Hydrogen Transport Rates through various coating materials at 1200° F.

| Coating Material | Diffusivity $cm^2$/sec | Thickness for 100 Hr, Breakthrough, cm | Permeability, mols/sec m $(Pa)^{1/2}$ |
|---|---|---|---|
| Pt | 2.3e−04 | 22.0 | 1.2e−11 |
| Au | 2.8e−05 | 7.7 | 3.3e−13 |
| Cu | 5.6e−05 | 11.0 | 2.0e−11 |
| W | 1.5e−04 | 18.0 | 7.7e−15 |
| Ag | 4.7e−05 | 10.1 | 2.7e−12 |
| Ni | 3.5e−05 | 8.7 | 3.1e−10 |

From: "Environmental Effects on Advanced Materials—III—Al Alloys", by Dr. Russell D. Kane As an illustrative application of the above-described factors in the preparation of electrodes, copper has a comparatively low affinity for dissolving hydrogen and deuterium and for forming hydrides, and a comparatively high coefficient of thermal expansion (17.5). Thus, it will be preferred to deposit metals directly on top of copper that will load hydrogen or deuterium to a comparatively higher hydrogen/deuterium to metal ratio than copper, that possess smaller lattice constants than copper prior to loading, and that have lower coefficients of thermal expansion than copper. Given these criteria, preferred metals for deposition on top of copper include niobium, nickel, tantalum, titanium, vanadium, and zirconium.

As disclosed above, in certain electrodes of the invention, tantalum will be incorporated in adhesion or base layers. Tantalum is known to be susceptible to embrittlement when loaded with Hydrogen isotopes. In accordance with another aspect of the invention, such tantalum-containing layers will be protected against hydrogen embrittlement by overlying layers that are resistant to hydrogen isotope diffusion. In a first embodiment, the tantalum-containing layer is protected by a layer of oxygen-free copper, also known as electronic grade or magnetron grade oxygen-free copper. Suitable sources of such copper include, for example, Mitibishi Materials Corporation under the brand descriptions of "MOF for Magnetron" and "MOF for super conductivity".

Another oxygen-free Copper is sold as a Zirconium-oxygen-free-Copper alloy developed by Thatcher Alloys, Ltd., United Kingdom, known as "Outokunpu Zirconium Copper Zrk015" (Zirconium content of 0.15%). As alternatives to oxygen-free copper in this setting, metals from the above-disclosed copper substitutes (for coating over tantalum) may be selected according to their relative solubility, permeability, affinity and embrittlement with respect to hydrogen. For preferred metals, these values will not be significantly higher than, and ideally less than, those of copper. For example, using these criteria, molybdenum and tungsten are preferred metals for forming barrier layers protecting tantalum against hydrogen embrittlement, as well as having lattice-constant mismatches with α-tantalum less than 11%. Iridium, osmium, platinum, rhenium, and rhodium constitute a second preferred group of metals for forming such a protective layer, while having a lattice-constant mismatch of 11% to 21% relative to α-tantalum.

Where necessary to achieve a stable interface with α-tantalum, the hydrogen-embrittlement-protecting material can be applied to α-tantalum using displacement plating deposition. For instance, an ultra thin layer of copper may first be deposited on top of α-tantalum using techniques such as PVD, CVD, MVE, or VPE. This ultra thin layer of copper can then be removed and replaced with the selected metal by displacement plating deposition. The resulting ultra thin layer of metal would serve as a seed layer for the deposition of addition atomic mono-layers of the selected metal through techniques such as PVD, CVD, MVE, VPE, electroless plating, or electro-plating thin film deposition methods. The remainder of the electrode structure can then be prepared as described herein.

It will be understood that where hydrogen embrittlement is not an issue (e.g. where hydrogen isotope loading will not be encountered in use), the selection of layers to deposit on top of α-tantalum need not be made with restrictions that pertain to hydrogen diffusivity or permeability, etc.

On the other hand, if extreme protection of an underlying tantalum-containing layer is desired, two or more layer of the same or different protective metals can be deposited over the top of the tantalum-containing layer. Illustratively, in addition to a copper layer (standard or oxygen-free copper), one or more layers of a hydrogen-diffusion/permeation-resistant metals selected from those disclosed above for deposition on top of copper, can be used. As examples, iridium, platinum, and rhodium are relatively resistant to hydrogen permeation/diffusion, and have a lattice-constant mismatch of less than 11% relative to copper. As additional examples, gold, molybdenum, silver, and tungsten exhibit lattice-constant mismatches of 11% to 21% relative to copper, and are relatively resistant to hydrogen permeation/diffusion. In the overall electrode design, those skilled in the art will understand that additional factors in the metal selection may include maximization of Fermi energy differences between film layers (preferably presenting a Fermi energy difference of greater than about 0.5, more preferably greater than about 1), minimizing inter-diffusion, and other factors as taught herein.

Another feature of the invention involves mitigation against deleterious electromigration affects that can occur within multi-layer thin film electrodes. Such mitigation will help to maximize the robustness, stability, and longevity of electrode devices operated under normal conditions. As a first example, the invention protects against diffusion of copper or copper substitutes, as discussed above, into the insulating substrate, where it can react with and poison the insulating substrate. In accordance with the invention, this electrodiffusion can be ameliorated utilizing the tantalum nitride/α-tantalum layers bonded to the silicon-based substrate. These tantalum-containing layers are resistant to diffusion of copper.

Another type of electromigration to be mitigated results from current-induced, physical transport of conductive material within an electrodes' thin film layers as a result of direct forces on ions from the voltage gradient, and/or momentum transferred directly between. moving electrons and atoms/ions. This unwanted net physical flux of material can cause materials in thin film layers to be depleted "upwind" and accumulated "downwind", forming empty voids in thin films upwind and hillocks downwind.

It is known that mass transport associated with electromigration occurs primarily along the metallic grain boundaries, up to approximately 50% of the melting point of any given material. In the case of multi-layer thin film electrodes, both types of forces are expected to be present, with protons or deuterons comprising the migrating ionic species.

Relatively more severe problems stemming from electromigration occur as a result of both electron wind and migrating ions at the intersection of three grain boundaries (known as a triple points). Atoms/ions accumulate at the intersection of these grain boundaries to form hillocks.

In the case of multi-layer thin film electrodes operating in wet electrochemical cells, there will be an additional electromigration affect, known as electrolytic electromigration, in addition to the solid state electromigration effects described above.

Another phenomenon in electromigration is known as thermal self-acceleration. In this phenomenon, increases of temperature, growth of voids, increases of local current density, and increases of Joule heating, participate in a loop that accelerates the electro-migration. For additional information as to these above-discussed aspects of electro-migration, reference can be made to Chang, Jing, "Electro-Migration and Related Integrated Circuit Failure", July, 2001 (Materials Engineering Department, Drexel University, PA).

Operating conditions for electrodes of the invention are expected to present the opportunity for the development of deleterious effects from electromigration. Preferred operations will involve minimum current densities of from about $10^2$ to about $10^5$ A/cm$^2$. Typical operating temperatures will be a minimum of 100° C., and may range up to 1,000° C. or more. In certain applications, operating temperatures will be in the range of about 100° C. to about 500° C., more typically 100° C. to 300° C. Preferred multi-layer thin film electrodes of the invention will also be expected to have useful operating lifetimes ranging from 5,000 to 100,000 hours.

Under these operating conditions, excessive electromigration has the potential to locally destroy sharp interfaces between different metal layers, create hillocks that introduce additional stresses in film lattice structures, which may compromise adhesion between layers and/or destabilize the physical and electronic integrity of the thin film structures, and/or create large numbers of empty voids that could cause localized de-loading of hydrogen isotopes as voids form, and/or compromise strength and integrity of adhesion and thin film structures as a whole.

In accordance with the invention, to mitigate against such deleterious affects, thin film layers can be incorporated which posses a relative large average grain size in relation to the layer thickness. Utilization of such large grain sizes relative to layer thickness can create a cross-sectional grain pattern known as a bamboo or bamboo-like structure.

Preferably, such bamboo grain structures will have a mean grain size having a dimension at least as thick as the layer in which the structure is incorporated. Such bamboo grain patterns are expected to maximize the stability, functional integrity, and operating lifetime of multi-layer thin film electrodes of the invention. Specifically, such grain patterns will provide the following benefits:

The highest possible percentage of grain boundaries within a layer will tend to be oriented perpendicular or at a high inclination to the electromigration pathways (a "proper" grain boundary alignment), rather than parallel to them (in "improper" alignment). Such a proper alignment will minimize overall electromigration fluxes that have a strong tendency to run parallel along the axes of primary electron and ion flows within a thin film layer.

The average geometrical relationship between grain intersections will be such that the number of triple points that occur in the thin film layer is minimized.

The average density (or alternatively stated, total surface area) of grain boundaries within the thin film layer will be decreased significantly; all other things being equal, since the total surface area associated with grain boundaries is reduced, electro-migration fluxes will also decrease in parallel with the reduction in grain boundary area.

Unavoidably, some percentage of the grain boundaries will be both connected to each other in nearly the same plane and/or run parallel to classic types of electro-migration pathways. With a bamboo grain pattern, these types of improper grain boundary alignments and in-plane couplings will not run for long distances through the thin film layer without eventually encountering a perpendicular or high inclination bamboo grain boundary. At that point, a back-stress gradient will be formed which slows or stops the further migration and tends to push transported material back in the opposite direction. This affect, in addition to vacancy concentration gradients and temperature cycling, can facilitate partial healing of electromigration-induced defects if the current is varied in some way, for example with A/C or pulsed D/C, or stopped.

Preferably, for each thin film layer in the working electrode, an ordinarily skilled practitioner will control the total thickness of each such thin film layer (in terms of the number of atomic monolayers comprising it) in conjunction with deposition and annealing techniques so that the layer's mean grain size will possess physical dimensions necessary to insure the creation of bamboo grain patterns in that layer. In so doing, the thin film layers will form a working electrode having an geometric form shaped either like flat, quasi-two-dimensional sheets, or like more complicated, quasi-two-dimensional sheets having various areas of positive and/or negative curvatures. The preferred bamboo-type grain patterns are preferably deposited and oriented so that they are as close as possible to being perpendicular (or at a high inclination) to the major flow of current and/or ions through the working thin film layers.

In this regard, control over mean grain size, inclinations of grain boundaries, and tightness of distribution of grain sizes around the mean for each working layer can be achieved in a number of ways, including for example by the selection of appropriate deposition methods. Illustratively, for some metals, electroplating and electroless plating depositions will be preferred as compared to various sputtering methods. This is because for certain metals, electroplating or electroless plating are known to produce significantly larger grain sizes than can be deposited with sputtering techniques. Starting with larger grain sizes during the initial deposition step will eliminate or reduce the amount of annealing required to achieve desired final mean grain sizes and tight size distributions. Further, subsequent annealing and patterning steps can be used to control grain size and grain size distributions. Annealing temperature, holding time at a specified temperature ("soaking"), and cooling rate are specific process parameters that will be uniquely determined for a given metal.

Damage from electromigration can also be controlled by maximizing heat dissipation out of the working layers of the thin film electrode. This, in turn, can be accomplished by a combination of: (a) controlling the total thickness of working layers of the thin film multilayer electrodes, (b) selecting substrates that can help conduct heat through the "Base Layers" of the electrodes, (c) selecting barrier layer materials that have physical properties that help facilitate heat conduction out of the thin film working layers, and (d) using macroscopic electrode and electrochemical cell geometries that maximize heat transfer out of thin film working layers into the electrolyte and/or another heat sink integrated with the cell.

In terms of substrates and heat transfer, $SiO_2$ is not as thermally conductive as pure Si at the operating temperatures likely to be experienced by multilayer thin film electrodes. To enhance thermal conductivity from the working layers through to the backside of the electrode, any $SiO_2$ layer present will advantageously be kept as thin as possible. Where an $SiO_2$ layer is used to interface with a first metal layer, underlying electrode substrate will desirably bond strongly with $SiO_2$, have good electrical insulating characteristics, have sufficient mechanical strength to support the attached thin film Layers, and have a high thermal conductivity (under typical electrode operating conditions and temperatures. Examples of suitable substrate materials meeting these. criteria include, for example, pure Si; crystalline $SiO_2$ (quartz); amorphous $SiO_2$ (quartz), amorphous diamond-like carbon, or other types of doped glasses or optical fibers, or ceramic materials containing substantial amounts of Si or N, such as $Al_6Si_2O_{13}$, $Si_3N_4$, or BN As disclosed above, electrode structures of the invention will include multilayer, thin film working electrodes, desirably formed of two or more different metal layers. A number of configurations or patterns for such working electrodes are contemplated. Some include repeating sequences of differing metal layers. Each such sequence may be comprised, for example, of two to ten or more different thin film layers. In preferred embodiments, these working electrodes will be deposited on top of a base or adhesion layer applied to a substrate as disclosed above, for example a silicon based substrate coated with SiO2/TaN/α-Ta/Cu or with a substitute for Cu as discussed above.

Assume that M1, M2, M3, M4, M5, M6, M7, M8, M9, and M10 are potential metals for use in the working electrode. The following illustrates ten different examples of repeat sequences (where S=Substrate, and B1=optional barrier layer) that may be used in the working electrode:
Simple Pairwise Repeating Sequence (M1/M2)
S/SiO2/TaN/α-Ta/(Cu or substitute)/M1/M2/M1/M21/ . . . M1/M2/B1

1: S/SiO2/TaN/α-Ta/Cu/Zr/Ni/Zr/Ni/ . . . /Zr/Ni/B1

2: S/SiO2/TaN/α-Ta/Ni/Nb/Ni/Nb/Ni/ . . . /Nb/Ni/B1

Triplet Repeating Sequence (M1/M2/M3)
S/SiO2/TaN/α-Ta/(Cu or subsbtute)/M2/M3/M1/M2/M3/ . . . /M1/M2/M3/B1

3: S/SiO2/TaN/α-Ta/Cu/γ-U/Ni/Ti/ . . . /γ-U/Ni/Ti/B1

4: S/SiO2/TaN/α-Ta/Fe/γ-U/Ni/Ti/γ-U/Ni/ . . . /γ-U/Ni/Ti/B1

Quadruplet Repeating Sequence (M1/M2/M3/M4)

S/SiO2/TaN/α-Ta/(Cu or substitute)/M1/M2/M3/M4/M1/M2/M3/M4/ . . . /M1/M2/M3/M4/B1

5: S/SiO2/TaN/α-Ta/Cu/Pd/Ni/Nb/Cu/Pd/Ni/Nb/Cu/ . . . /Pd/Ni/Nb/Cu/B1

6: S/SiO2/TaN/α-Ta/W/Ti/Ni/γ-U/Cu/Ti/Ni/γ-U/Cu/ . . . /Ti/Ni/γ-U/Cu/B1

Mixed Repeating Sequence #1 ((M1/M2/M4)+(M8/M9))

S/SiO2/TaN/α-Ta/CuM1/M2/M4/M8/M9/M1/M2/M4/M8/M9/ . . . /M1/M2/M4/M8/M9/B1

7: S/SiO2/TaN/α-Ta/Cu/α-Ta/Nb/W/Fe/Co/α-Ta/Nb/W/Fe/Co/ . . . /αTa/Nb/W/Fe/Co/B1

8: S/SiO2/TaN/α-Ta/ W/β-Ti/Ni/Nb/Co/Fe/β-Ti/Nb/Co/Fe/ . . . βTi/Ni/Nb/Co/Fe/B1

Mixed Repeating Sequence #2 ((M1+M2)+(M6)+(M8+M9)) where [M6] is a conducting thin film alloy or compound with special chemical, electronic, and/or magnetic properties S/SiO2/TaN/α-Ta/Cu/M1/M2/M6/M8/M9/M1/M2/M6/M8/M9/ . . . /M1/M2/M6/M8/M9/B1

9: S/SiO2/TaN/α-Ta/Cu/Au/Al/[CePd3]/Al/Ir/Au/Al/[CePd3]/Al/Ir/ . . . /Au/Al/[CePd3]/Al/Ir/B1

With M6=CePd3 being an example of a heavy electron compound.

10: S/SiO2TaN/α-Ta/Cu/Nb/Mo/[NiFe]Mo/β-Ti/Nb/Mo/[NiFe]/Mo/β-Ti/ . . . Nb/Mo/[NiFe]/Mo/β-Ti/B1

With M6=NiFe being an example of a ferromagnetic compound

11: S/SiO2TaN/α-Ta/Cu/Au/Al/[ZrV2]/Al/Ir/Au/Al/[CePd3]/Al/Ir/ . . . /Au/Al/[CePd3]/Al/Ir/B1

With M6=ZrV2 being an example of a compound that absorbs Hydrogen up to ZrV2H5.2

Preferred electrode devices of the invention will also preferably include one or more barrier layers (e.g. 14a–14c, FIG. 1) covering the electrode structure. For flat or curved planar electrodes, this may include a top barrier 14a and side barriers 14b and 14c. When used, these barrier layers will desirably possess some or all of the following mechanical, electrical, and chemical characteristics:

1. Serve as a diffusion barrier for hydrogen, deuterium, and/or protons and/or deuterons.
2. Excellent conductor of heat.
3. High dielectric strength and low electrical conductivity.
4. Low coefficient of thermal expansion (CTE).
5. Excellent adhesion to a variety of metallic and non-metallic substrates.
6. Little or no reactivity with aqueous electrolytes at expected operating temperatures.
7. Resist salt solutions, acids, alkalis, and other corrosive agents.
8. Thermal stability as high as possible, preferably up to 1,000° C.
9. High thermal shock resistance.
10. High stability under thermal cycling.
11. High elastic modulus, tensile strength, and compressive strength.
12. Low internal stress for reasonable range of thicknesses.
13. Comparatively low deposition temperatures (preferably significantly less than 200° C.).
14. Compatibility with a variety of metallic dopants.

In a preferred aspect of the invention, barrier layers will be provided that are made from amorphous carbon coatings, for example amorphous diamond-like coatings. Suitable such coating materials are available commercially under the brand name of "Dylyn", produced and sold by Bekaert Advanced Coating Technologies, Amherst, N.Y., USA. Dylyn meets all of the above criteria and possesses the following properties:

1. Undoped Dylyn is an amorphous, pure carbon material composed of nano-sized particles that can serve as an excellent barrier to the diffusion and passage of hydrogen, deuterium, and/or protons
2. Diamond and diamond-like materials such as Dylyn have some of the highest known thermal conductivities of any material—on the order of 20 Watts/cm$^2$
3. Undoped Dylyn has a dielectric strength of 4.0 million volts/cm and resistivity of $10^{16}$ Ohms/cm
4. Coefficient of thermal expansion is $0.8 \times 10^{-6}$ K$^{-1}$, rather low and similar to SiO2 ($0.5 \times 10^{-6}$ K$^{-1}$)
5. Excellent adhesion and bonding to Si, SiO$_2$, alumina ceramics, Pt, Pd, Rh and a number of other carbide-forming materials such as Ti, Zr, V, Nb, Ta, Cr, Mo, W, Fe, Co, Ni, Al, and certain other carbide-forming rare earth metals. Certain noble metals such as Ag, Au, and Cu do not adhere well to Dylyn.
6. Stable up to 400° C. in the presence of Oxygen; greater than 1,200° C. in the absence of Oxygen
7. Extremely low chemical reactivity and inert to almost all chemicals: coatings resist acids (hydrochloric or sulfuric; certain formulations can even resist HF), alkalis, dilute or concentrated salt solutions, and a variety of other corrosive agents
8. See item 6 above.
9. High thermal shock resistance: a hot Dylyn-coated sample can be plunged into liquid nitrogen without suffering damage
10. Known from existing commercial applications to be very stable under extensive thermal cycling
11. High elastic modulus of 100–400 GPa tested high tensile strength of $3.5 \times 10^9$ Pascals, and high compressive strength of $10^{11}$ Pascals.
12. In current commercial applications, Dylyn coatings 2 to 3 microns thick are routinely deposited and exhibit relatively low internal stresses of 100 to 1,000 MPa. Internal stresses do increase with increasing thickness of Dylyn coatings: at this point in time, the maximum thickness that can be deposited with reasonable levels of internal stress on an experimental basis is about 20 microns.
13. Depending on the material on which Dylyn is to be deposited, deposition temperatures for Dylyn are relatively low and range from a minimum of 25° C. and a maximum of about 200° C. This feature is very attractive for fabricating the Invention's electrodes, because Dylyn's low deposition temperatures will not interfere with the results of earlier fabrication steps involved in the deposition and thermal processing (annealing) of lower adhesion coatings and working layers of an electrode that lie beneath the barrier layer.
14. In particular applications where specialized properties are desirable, Au and Cu can be used in conjunction with Dylyn as dopants. Pd, Pt, Rh and all of the previously listed carbide-forming preferred metals can also be used with Dylyn as dopants to concentrations ranging as high as 40 atomic %.

When Dylyn is used as an upper and side barrier Layer (with one end of the electrode having "open" exposed edges or surfaces of working layers where electrons and hydrogen/deuterium can enter the electrode, as taught by Miley in WO0163010), the preferred thickness for such barrier layers is 2 to 3 microns. When Dylyn is used as an upper barrier layer, it is preferably deposited on top of a carbide-forming metal or other material such as Pt, Pd, Rh and a number of other carbide-forming metals such as Ti, Zr, V, Nb, Ta, Cr, Mo, W, Fe, Co, Ni, Al, and certain other carbide-forming rare earth metals. The particular metals present in the working electrode and adhesion coating are of less importance when Dylyn is used as a side barrier layer (14b and 14c in FIG. 1), because Dylyn's amorphous structure and enormous mechanical strength should allow it to "span" occasional layers of metals that adhere only poorly to Dylan e.g. certain noble metals such as Ag, Au, Cu.

In addition or as an alternative to its use as a barrier layer(s) an amorphous carbon layer such as Dylyn may be used within the electrode structure. For example, the amorphous carbon layer may be used in between a substrate and an $SiO_2$ layer. In this manner, the amorphous carbon layer, preferably about 2 to about 20 microns thick, may serve as a heat transfer buffer layer that is used to transfer heat from layers above to the substrate which may include alumina ceramics, heat sinks composed of certain compatible metals such as extruded Al, and compatible physical materials that are used to further transfer heat directly to the operationally hot side of thermoelectric and thermionic devices. The inclusion of such a layer of amorphous carbon in the thin film multilayer structure has the effect of encasing the adhesion coating or base layers as well as a large percentage of working layers of a thin film multilayer electrode with an amorphous carbon coating. This helps improve heat transfer out of working electrode layers and contributes to overall stability of the entire multilayer structure because Dylyn (or similar amorphous carbon coatings) possesses an advantageous combination of properties that include: ability to function as an excellent hydrogen/deuterium/proton barrier layer, high dielectric strength, extreme thermal conductivity, and exceptional mechanical strength.

Another aspect of the invention involves the use of a graphite layer as a heat transfer buffer layer within thin film electrodes of the invention. A suitable graphite for this purpose is described, for example, in U.S. Pat. No. 6,037,032 assigned to Oak Ridge National Laboratory. It is produced and marketed commercially under the brand name of "PocoFoam Graphite" by Poco Graphite, Inc., of Decatur, Tex., U.S.A.

PocoFoam is a specially prepared form of amorphous carbon that has excellent thermal conductivity and heat transfer capabilities relative to its weight. PocoFoam has a "foamed" cellular structure consisting of mostly empty, interconnected spherical voids in which the structure exhibits distinctive, highly graphitic aligned ligaments within the foam's cell walls. Due to its porosity (typically 73% to 82%), PocoFoam does not provide preferred properties for use as a diffusion barrier for hydrogen, deuterium, and/or protons. However, PocoFoam graphite carbon foam can be utilized with advantage as an optional heat transfer buffer layer within the substrate layers of the thin film electrodes of the invention.

PocoFoam graphite carbon possesses the following properties:

1. Thermal conductivity=100 to 150+W/m-K; 58–87 $BTU.ft/ft^2.hr.°$ F. Heat transfer efficiencies have been shown to be substantially better than aluminum or copper.
2. Electrical resistivity=300 to 1,000 micro ohm inch.
3. Coefficient of thermal expansion (ACTED)=2 to 3 $\mu m/m°$ K; 1.1 to 1.6 $\mu in/in-°$ F.
4. Heat capacity=0.7 J/g-K; 0.17 BTU/lb.° F.
5. Compressive strength=2.07 MPa (density at 0.5 gm/cc); 300 psi (density at 31 $lb/ft^3$)
6. Average pore diameter=350 microns; 0.0138 inches
7. Specific surface area=>4 $m^2/g$; 19,500 $ft^2/lb$
8. Open porosity=96%: total porosity=73–82%

The application of PocoFoam or other similar graphite substances in electrodes of the invention may involve the use of a thin Pocofoam layer bonded directly to the substrate (i.e. used as layer 12a in FIG. 1). All layers occurring above layer 12a can occur as described otherwise herein, including the use of additional layers in an adhesion coating, such as a tantalum nitride layer bonded to the graphite layer, a tantalum (especially α-tantalum) layer bonded to the tantalum nitride layer, a copper or copper-substitute layer bonded to the tantalum nitride layer, and working electrode layers bonded to the copper or copper-substitute layer, etc. It should also be noted in this regard that the use of the Pocofoam or other graphite material as layer 12a can provide an alternative to the use of silicon-dioxide as layer 12a in embodiments of the invention. The use of such a graphite material can provide one or more of the following advantages:

1. Enable high thermal conductivity and efficient thermal energy transfer out through the bottom "base" layers of the electrode.
2. Provide sufficient adhesion and thermal stability with respect to thin-film layers of hcp/bcc TaN compounds deposited on top of the graphite slice or other layer.
3. Allow reduction in total mass of the electrode structure relative to overall thermal conductivity and thermal transfer capabilities of the device.
4. Exhibit relatively low electrical conductivity in the substrate layers compared to electrical conductivity of the metallic "working layers" of the electrodes, which helps to maximize electrical current densities through the working layers for a given electric input power.
5. When TaN is deposited in sufficient thickness to thoroughly fill the exposed voids in the uppermost sliced surface of graphite foam immediately adjacent to the TaN layers, it enables creation of a dimpledt substantially concave upper surface for the entire TaN layer, upon which α-Ta can then be deposited. This technique produces a substantially concave substrate interface upon which an electrode's "upper" working thin film layers can then be deposited. The "dimples" in the TaN surface are replicated with some attenuation in subsequent thin-film layers deposited on top of the TaN. Thus, the use of the porous graphite as an underlying layer enables the creation of electrode interfaces with a high percentage of their surface area having a concave curvature.
6. The graphite slice can be strongly bonded to the substrate. One suitable bonding and joining technology (tradenamed as "S-bond") has been developed by Materials Research International (MRI) located in Lansdale, Pa., U.S.A. MRI's S-bond Alloys 220 and 400 can be used to join PocoFoam to the substrate from 250–270° C. and 410–420°C., respectively. These alloys wet and adhere to both surfaces, have low capillarity, and will not fill up the pores in the PocoFoam.

The present invention also provides electrical cells incorporating electrodes of the invention. These may, for example, be dry or wet electrical cells. For example, electrodes of the invention can be incorporated as cathode elements in electrochemical cells as described by Miley in WO9807898 entitled FLAKE-RESISTANT MULTILAYER THIN-FILM ELECTRODES AND ELECTROLYTIC CELLS INCORPORATING SAME, published Feb. 26, 1998, which is hereby incorporated herein by reference in its entirety. Generally, such cells may include a packed bed of cathodic electrode pellets arranged in a flowing electrolytic cell. The packed bed of pellets allows flow area, and the packing fraction may be fairly large, leading to a large electrode surface area, which is desirable to provide a high reaction rate per unit volume. In addition, the packed bed of pellets provides a small pressure drop at the modest flow rates.

Electrodes of the invention may also be arranged as described by Miley in WO0163010 entitled ELECTRICAL CELLS, COMPONENTS AND METHODS, published Aug. 30, 2001, which is hereby incorporated herein by reference in its entirety, and/or incorporated into electrical cell devices as disclosed therein. Thus, electrodes of the invention can included in an electrode device having a substrate and an anode and cathode provided in discreet locations on the substrate and thus having a gap therebetween. In such arrangements, the multilayer thin film electrodes of the invention are preferably provided as the cathode. Operation of such an electrode device in the presence of an electrolyte (e. g. an aqueous electrolyte, optionally including heavy water) filling the gap and contacting the electrode surfaces results in the electro-migration of the ions (e. g. protons or deuterons) within the cathode and the creation of a region in the cathode enriched in these ions.

Electrodes of the invention can also be included in solid-state cell arrangements as described in the above-cited WO0163010,which include anodic and cathodic connections to the electrode provided as a conductive element. A solid-state source of the ions is provided and arranged to feed the ions into the conductive element. For example, such a solid-state source can include a metal hydride or a corresponding deuteride for release of hydrogen or deuterium in gaseous form, and a catalyst for splitting the gaseous hydrogen or deuterium so as to provide protons or deuterons. The catalyst may be layered onto the conductive element, and the metal hydride may be layered onto the catalyst. In this fashion, gas released by the metal hydride (e. g. by heating) immediately contacts the catalyst to provide protons or deuterons, which can then migrate into and along the working layers of the electrode of the invention (conductive element) when a voltage drop is applied across the electrode. Preferred arrangements include a barrier layer, as discussed above, along at least a portion of the conductive element that resists permeation by the protons or deuterons. Cell arrangements of this embodiment may advantageously be incorporated into various geometric devices such as the cylindrical cell devices as described in connection with FIGS. 5–8 of WO0163010.

In electrical cell applications including the recovery and/or conversion of heat, cells incorporating electrodes of the invention may also include one or more thermoelectric converter elements thermally coupled to the thin films of the working electrode (see, e.g. thermoelectric element 15 shown in phantom in FIG. 1). For example, the thermoelectric element(s) and electrode(s) can be bonded to one another in a back-to-back fashion or otherwise thermally coupled in a fashion facilitating heat transfer from the electrode device(s) to the thermoelectric element(s).

For instance, in one embodiment, the thermoelectric element(s) may serve as the substrate(s) for the electrode(s) of the invention as described above including a substrate and an anode and cathode thereon in discrete locations. As one mode of utilization, a plurality of such combined structures can be arranged in a cell leaving spaces for electrolyte flow and spaces for coolant flow through the cell (see WO0163010, the combined structures. In this fashion, as the cell is operated, a temperature differential can be created across the thermoelectric converter elements, thus promoting the generation of electric energy.

Electrical cell devices of the invention can be used for example in the electrolysis of electrolytes such as water, forming hydrogen and oxygen gases, and may also be used in energy conversion devices or cells which include the generation of heat and optionally conversion of the heat to electrical energy, and/or in causing transmutation reactions. Devices of the invention may also be used to provide densified regions of ions or hydrogen or its isotopes, increasing the probability of and facilitating the further study of ion—ion reactions or ion-metal reactions, including exploring fusion and related reactions.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed is:

1. An electrode for an electrical cell, comprising:

a) a non-conductive substrate;

b) an adhesion coating bonded to the non-conductive substrate;

c) a multilayer working electrode bonded to said adhesion coating, said multilayer working electrode including at least one layer of a first conductive metal, and at least one layer of a second conductive metal;

wherein said substrate has a concave surface; and wherein said adhesion coating and multilayer working electrode are bonded upon said concave surface.

2. The electrode of claim 1, wherein:

said non-conductive substrate has a siliceous surface.

3. The electrode of claim 1, wherein:

said adhesion coating has multiple layers.

4. The electrode of claim 3, wherein:

said adhesion coating comprises a tantalum nitride layer bonded to said substrate.

5. The electrode of claim 4, wherein:

said adhesion coating comprises an α-tantalum layer bonded to said tantalum nitride layer.

6. The electrode of claim 5, wherein said adhesion coating comprises a copper layer bonded to said α-tantalum layer.

7. The electrode of claim 1, wherein said first and second conductive metals have a Fermi energy difference of at least about 0.5.

8. The electrode of claim 1, wherein said at least one layer of a first conductive metal and at least one layer of a second conductive metal have a thickness of less than about 10,000 Angstroms.

9. The electrode of claim 1, wherein said multilayer working electrode comprises at least four layers.

10. The electrode of claim 1, also comprising a barrier layer atop said multilayer working electrode.

11. The electrode of claim 10, wherein said barrier layer comprises amorphous carbon.

12. An electrode, comprising:

a) an electrode structure comprising a plurality of thin metal layers; and b) an amorphous carbon layer.

13. The electrode of claim 12, wherein said amorphous carbon layer is an amorphous diamond layer.

14. The electrode of claim 12, also comprising a non-conductive substrate, said electrode structure adhered to sand nonconductive substrate.

15. The electrode of claim 14, also including an adhesion coating intermediate said electrode structure and said non-conductive substrate.

16. The electrode of claim 15, wherein said adhesion coating has multiple layers.

17. The electrode of claim 16, wherein said adhesion coating includes a tantalum nitride layer adhered directly to said non-conductive substrate.

18. The electrode of claim 17, wherein said adhesion coating further includes an α-tantalum layer adhered directly to said tantalum nitride layer.

19. The electrode of claim 18, also including a copper layer bonded to said α-tantalum layer.

20. An electrode for an electrochemical cell, comprising:
 a) an electrode structure comprising a plurality of thin metal layers; and
 b) wherein at least one of said thin metal layers exhibits a bamboo grain pattern.

21. The electrode of claim 20, also comprising a non-conductive substrate, said electrode structure adhered to said non-conductive substrate.

22. The electrode of claim 21, also including an adhesion coating intermediate said electrode structure and said non-conductive substrate.

23. The electrode of claim 22, wherein said adhesion coating has multiple layers.

24. The electrode of claim 23, wherein said adhesion coating includes a tantalum nitride layer adhered directly to said non-conductive substrate.

25. The electrode of claim 24, wherein said adhesion coating further includes an α-tantalum layer adhered directly to said tantalum nitride layer.

26. The electrode of claim 25, also including a copper layer bonded to said α-tantalum layer.

27. An electrode for an electrical cell, comprising:
 a) an electrode structure comprising a plurality of thin metal layers; and
 b) wherein said thin metal layers include a first metal layer and a second metal layer; and
 c) wherein said first metal layer has a lattice mismatch relative to said second metal layer of less than about 21%.

28. The electrode of claim 27, wherein said first metal layer comprises α-tantalum.

29. The electrode of claim 28, wherein said second metal layer comprises a metal having a lattice constant mismatch of less than about 11% relative to said tantalum.

30. The electrode of claim 29, wherein said second metal layer comprises niobium.

31. The electrode of claim 29, wherein said second metal layer comprises beta-titanium.

32. The electrode of claim 29, wherein said second metal layer comprises tungsten.

33. The electrode of claim 29, wherein said second metal layer comprises molybdenum.

34. The electrode of claim 29, wherein said second metal layer comprises vanadium.

35. The electrode of claim 29, wherein said second metal layer comprises hafnium, erbium, dysprosium, samarium, gadolinium, or neodymium.

36. The electrode of claim 29, wherein said second metal layer comprises zirconium.

37. The electrode of claim 29, wherein said second metal layer comprises nickel.

38. The electrode of claim 29, wherein said second metal layer comprises chromium.

39. The electrode of claim 28, wherein said second metal layer comprises a metal having a lattice constant mismatch in the range of about 11% to about 21% relative to said tantalum.

40. The electrode of claim 39, wherein said second metal layer comprises iron.

41. The electrode of claim 39, wherein said second metal layer comprises cobalt.

42. The electrode of claim 39, wherein said second metal layer comprises rhodium.

43. The electrode of claim 39, wherein said second metal layer comprises iridium.

44. The electrode of claim 39, wherein said second metal layer comprises rhenium.

45. The electrode of claim 39, wherein said second metal layer comprises osmium.

46. The electrode of claim 39, wherein said second metal layer comprises palladium.

47. The electrode of claim 39, wherein said second metal layer comprises ruthenium.

48. The electrode of claim 39, wherein said second metal layer comprises platinum.

49. The electrode of claim 27, wherein at least one of said first and second metal layers comprises a metal alloy.

50. The electrode of claim 27, wherein at least one of said first and second metal layers comprises a metal selected from copper, gold, nickel, palladium, rhodium, silver, cobalt and iron.

51. The electrode of claim 27, wherein at least one of said first and second metal layers comprises a metal selected from silver, gold, platinum, palladium, rhodium, iridium, rhenium, osmium and ruthenium.

52. The electrode of claims 27, wherein at least one of said first and second metal layers has been annealed.

53. An electrode for an electrical cell, comprising:
 a substrate;
 a tantalum nitride layer adhered to said substrate;
 a tantalum layer adhered to said tantalum nitride layer;
 a copper layer bonded to said tantalum layer; and
 a first metal layer bonded to said copper layer, said first metal layer comprising neodymium, nickel, samarium, uranium, thallium, rhodium, iridium, palladium, titanium, platinum, niobium, aluminum, magnesium, gold, molybdenum, silver, vanadium, iron, gadolinium, dysprosium, or hafnium.

54. The electrode of claim 53, wherein said first metal layer comprises neodymium.

55. The electrode of claim 54, also comprising a second metal laer-bonded to said first metal layer.

56. The electrode of claim 55, wherein said second metal layer comprises a member selected from the group consisting of copper, iridium, niobium, nickel, palladium, platinum, rhodium, tantalum, titanium, uranium, zirconium, silver, gold, molybdenum, vanadium and tungsten.

57. The electrode of claim 56, wherein said member is selected from the group consisting of copper, iridium, niobium, nickel, palladium, platinum, rhodium, tantalum, titanium, uranium and zirconium.

58. The electrode of claim 53, wherein said first metal layer comprises nickel.

59. The electrode of claim 58, also comprising a second metal layer bonded to said first metal layer.

60. The electrode of claim 57, wherein said second metal layer comprises a member selected from the group consisting of copper, iridium, niobium, neodymium, palladium, rhodium, tantalum, titanium, uranium, zirconium, silver, gold, molybdenum, platinum, vanadiumnd tungsten.

61. The electrode of claim 60, wherein said member is selected from the group consisting of copper, iridium, niobium, neodymium, palladium, rhodium, tantalum, titanium, uranium, and zironsium.

62. The electrode of claim 58, also comprising a second metal layer bonded to said first metal layer.

63. The electrode of claim 62, wherein said second metal layer comprises a member selected from the group consisting of copper, magnesium, neodymium, nickel, rhodium, titanium, thallium, aluminum, gold, palladium, platinum and vanadium.

64. The electrode of claim 63, wherein said member is selected from the group consisting of copper, magnesium, neodymium, nickel, rhodium, titanium, and thallium.

65. The electrode of claim 53, wherein said first metal layer comprises samarium.

66. The electrode of claim 65, also comprising a second metal lay grbonded to said first metal layer.

67. The electrode of claim 66, wherein said second metal layer comprises a member selected from the group consisting of copper, dysprosium, erbium, gadolinium, niobium, neodymium, nickel, palladium, platinum, rhenium, ruthenium, beta-titanium, vanadium, tungsten, zirconium, cobalt, chromium, iron, palladium, platinum, rhenium, and rhodium.

68. The electrode of claim 67, wherein said member is selected from the group consisting of copper, dysprosium, erbium, gadolinium, niobium, neodymium, nickel, palladium, platinum, rhenium, ruthenium, beta-titanium, vanadium, tungsten, and zirconium.

69. The electrode of claim 53, wherein said first metal layer comprises uranium.

70. The electrode of claim 53, wherein said first metal layer comprises thallium.

71. The electrode of claim 70, also comprising a second metal laver bonded to said first metal layer.

72. The electrode of claim 70, wherein said second metal layer comprises a member selected from the group consisting of copper, magnesium, uranium and aluminum.

73. The electrode of claim 72, wherein said member is selected from the group consisting of copper, magnesium, and uranium.

74. The electrode of claim 53, whein said first metal layer comprises rhodium.

75. The electrode of claim 74, also comprising a second metal layer bonded to said first metal layer.

76. The eletrode of claim 75, wherein said second metal layer comprises a member selected from the group consisting of silver, aluminum, copper, iridium, neodymium, nickel, palladium, platinum, uranium, zirconium, molybdenum, niobium, tantalum, titanium, and tungsten.

77. The electrode of claim 76, wherein said member is selected from the group consisting of silver, aluminum, copper, iridium, neodymium, nickel, palladium, platinum, uranium, and zirconium.

78. The electrode of claim 53, wherein said first metal layer comprises iridium.

79. The electrode of claim 78, also comprising a second metal layerlbonded to said first metal layer.

80. The electrode of claim 79, wherein said second metal layer comprises a member selected from the group consisting of silver, gold, copper, neodymium, nickel, palladium, platinum, rhodium, zirconium, molybdenum, niobium, tantalum, and titanium.

81. The electrode of claim 79, wherein said member is selected from the group consisting of silver, gold, copper, neodymium, nickel, palladium, platinum, rhodium, and zirconium.

82. The electrode of claim 53, wherein said first metal layer comprises palladium.

83. The electrode of claim 82, also comprising a second metal layer bonded to said first metal layer.

84. The electrode of claim 83, wherein said second metal layer comprises a member selected from the group consisting of silver, gold, copper, iridium, neodymium, nickel, platinum, rhodium, molybdenum, niobium, tantalum, titanium, uranium, and zirconium.

85. The electrode of claim 84, wherein said member is selected from the group consisting of silver, gold, copper, iridium, neodymium, nickel, platinum, and rhodium.

86. The electrode of claim 53, wherein said first metal layer comprises titanium.

87. The electrode of claim 86, also comprising a second metal layer bonded to said first metal layer.

88. The electrode of claim 87, wherein said second metal layer comprises a member selected from the group consisting of copper, molybdenum, niobium, neodymium, nickel, tantalum, uranium, vanadium, tungsten, zirconium, cobalt, iron, iridium, palladium, platinum, rhenium, and rhodium.

89. The electrode of claim 88, wherein said member is selected from the group consisting of copper, molybdenum, niobium, neodymium, nickel, tantalum, uranium, vanadium, tungsten, and zirconium.

90. The electrode of claim 53, wherein said first metal layer comprises platinum.

91. The electrode of claim 90, also comprising a second metal layerbonded to said first metal layer.

92. The electrode of claim 91, wherein said second metal layer comprises a member selected from the group consisting of gold, copper, iridium, neodymium, palladium, rhodium, molybdenum, niobium, nickel, tantalum, titantium, uranium, and zirconium.

93. The electrode of claim 92, wherein said member is selected from the group consisting of gold, copper, iridium, neodymium, palladium, and rhodium.

94. The electrode of claim 53, wherein said first metal layer comprises niobium.

95. The electrode of claim 94, also comprising a second metal layer bonded to said first metal layer.

96. The electrode of claim 95, wherein said second metal layer comprises a member selected from the group consisting of copper, molybdenum, neodymium, nickel, tantalum, titanium, vanadium, tungsten, zirconium, cobalt, iron, iridium, osmium, palladium, platinum, rhum,rhdium, and ruthenium.

97. The electrode of claim 96, wherein said member is selected from the group consisting of copper, molybdenum, neodymium, nickel, tantalum, titanium, vanadium, tungsten, and zirconium.

98. The electrode of claim 53, wherein said first metal layer comprises aluminum.

99. The electrode of claim 98, also comprising a second metal layer bonded to said first metal layer.

100. The electrode of claim 99, wherein said second metal layer comprises a member selected from the group consisting of gold, copper, thallium, uranium, and zirconium.

101. The electrode of claim 100, wherein said member is gold.

102. The electrode of claim 53, wherein said first metal layer comprises magnesium.

103. The electrode of claim 102, also comprising a second metal layer bonded to said first metal layer.

104. The electrode of claim 103, wherein said second metal layer comprises a member selected from the group consisting of thallium, uranium and copper.

105. The electrode of claim 104, wherein said member is selected from the group consisting of thallium and uranium.

106. The electrode of claim 53, wherein said first metal layer comprises gold.

107. The electrode of claim 106, also comprising a second metal layer bonded to said first metal layer.

108. The electrode of claim 107, wherein said second metal layer comprises a member selected from the group consisting of silver, aluminum, iridium, palladium, platinum, rhodium, copper, neodymium, nickel, thorium, uranium, and zirconium.

109. The electrode of claim 108, wherein said member is selected from the group consisting of silver, aluminum, iridium, palladium, platinum, and rhodium.

110. The electrode of claim 53, wherein said first metal layer comprises molybdenum.

111. The electrode of claim 110, also comprising a second metal layer bonded to said first metal layer.

112. The electrode of claim 111, wherein said second metal layer comprises a member selected from the group consisting of iron, niobium, tantalum, titanium, vanadium, tungsten, zirconium, cobalt, iridium, neodymium, nickel, osmium, palladium, platinum, rhenium, rhodium, and ruthenium.

113. The electrode of claim 112, wherein said member is selected from the group consisting of iron, niobium, tantalum, titanium, vanadium, tungsten, and zirconium.

114. The electrode of claim 53, wherein said first metal layer comprises silver.

115. The electrode of claim 114, also comprising a second metal layerbonded to said first metal layer.

116. The electrode of claim 115, wherein said second metal layer comprises a member selected from the group consisting of aluminum, gold, iridium, palladium, rhodium, copper, neodymium, nickel, thallium, uranium, and zirconium.

117. The electrode of claim 116, wherein said member is selected from the group consisting of aluminum, gold, iridium, palladium, and rhodium.

118. The electrode of claim 53, wherein said first metal layer comprises vanadium.

119. The electrode of claim 118, also comprising a second metal layer bonded to said first metal layer.

120. The electrode of claim 119, wherein said second metal layer comprises a member selected from the group consisting of cobalt, iron, molybdenum, niobium, osmium, rhenium, tantalum, titanium, tungsten, copper, neodymium, nickel, ruthenium, uranium, and zirconium.

121. The electrode of claim 120, wherein said member is selected from the group consisting of cobalt, iron, molybdenum, niobium, osmium, rhenium, tantalum, titanium, and tungsten.

122. The electrode of claim 53, wherein said first metal layer comprises iron.

123. The electrode of claim 122, also comprising a second metal layer bonded to said first metal layer.

124. The electrode of claim 123, wherein said second metal layer comprises a member selected from the group consisting of cobalt, molybdenum, osmium, rhenium, ruthenium, vanadium, tungsten, niobium, tantalum, and titanium.

125. The electrode of claim 124, wherein said member is selected from the group consisting of cobalt, molybdenum, osmium, rhenium, ruthenium, vanadium, and tungsten.

126. The electrode of claim 53, wherein said first metal layer comprises gadolinium.

127. The electrode of claim 126, also comprising a second metal layer bonded to said first metal layer.

128. The electrode of claim 127, wherein said second metal layer comprises a member selected from the group consisting of copper, dysprosium, erbium, iridium, niobium, neodymium, nickel, palladium, platinum, rhodium, samarium, α-tantalum, β-titanium, γ-uranium, zirconium, silver, gold, hafnium, molybdenum, vanadium, and tungsten.

129. The electrode of claim 128, wherein said member is selected from the group consisting of copper, dysprosium, erbium, iridium, niobium, neodymium, nickel, palladium, platinum, rhodium, samarium, α-tantalum, β-titanium, γ-uranium, and zirconium.

130. The electrode of claim 53, wherein said first metal layer comprises dysprosium.

131. The electrode of claim 130, also comprising a second metal layer bonded to said first metal layer.

132. The electrode of claim 131, wherein said second metal layer comprises a member selected from the group consisting of copper, erbium, gadolinium, iridium, niobium, neodymium, nickel, palladium, platinum, rhodium, samarium, α-tantalum, β-titanium, γ-uranium, zirconium, silver, gold, hafnium, molybdenum, vanadium, and tungsten.

133. The electrode of claim 132, wherein said member is selected from the group consisting of copper, erbium, gadolinium, iridium, niobium, neodymium, nickel, palladium, platinum, rhodium, samarium, α-tantalum, β-titanium, turanium, and zirconium.

134. The electrode of claim 53, wherein said first metal layer comprises hafnium.

135. The electrode of claim 134, also comprising a second metal layer bonded to said first metal layer.

136. The electrode of claim 135, wherein said second metal layer comprises a member selected from the group consisting of chromium, molybdenum, niobium, nickel, α-tantalum, β-titanium, vanadium, tungsten, zirconium, cobalt, dysprosium, erbium, iron, iridium, gadolinium, neodymium, osmium, rhenium, rhodium, ruthenium, and samarium.

137. The electrode of claim 136, wherein said member is selected from the group consisting of chromium, molybdenum, niobium,. nickel, α-tantalum, β-titanium, vanadium, tungsten, zirconium.

138. An electrode for an electrical cell, comprising:
  a) a substrate;
  b) a muflilayer working electrode on said substrate, said multilayer working electrode including at least one layer of a first conductive metal, and at least one layer of a second conductive metal; and
wherein said first and second conductive metals have a lattice constant mismatch of less than about 21% when saturated with hydrogen or its isotopes.

139. The electrode of claim 138, wherein said first conductive metal and said second conductive metal exhibit substantially equivalent swelling upon saturation with hydrogen or its isotopes.

140. The electrode of claim 138, wherein said first conductive metal and second conductive metal exhibit a decreasing lattice constant mismnatch upon saturation with hydrogen or its isotopes.

141. An electrode for an electrical cell exhibiting resistance to damage from electromigration in use, comprising:
   a) a substrate;
   b) a multilayer working electrode on said substrate, said multilayer working electrode including at least one layer of a first conductive metal, and at least one layer of a second conductive metal; and wherein at least one of said first and second conductive metals has a mean grain size having a diameter at least about equal to a thickness of the layer in which it is contained.

142. An electrical cell apparatus, comprising an electrode of any of claims 1, 20, 22, 53, 138 and 141.

143. A method for localizing a concentration of ions of hydrogen or its isotopes, comprising: providing an electrical cell apparatus of claim 142; and causing said ions to form a localized concentration of ions within said electrode by electromigration.

144. An electrode for an electrical cell, comprising:
   a) a non-conductive substrate;
   b) an adhesion coating bonded to the non-conductive substrate;
   c) a multilayer working electrode bonded to said adhesion coating, said multilayer working electrode including at least one layer of a first conductive metal, and at least one layer of a second conductive metal;
   wherein said substrate has a convex surface; and
   wherein said adhesion coating and multilayer working electrode are bonded upon said convex surface.

145. The electrode of claim 144, wherein said adhesion coating comprises a tantalum nitride layer bonded to said substrate.

146. The electrodeof claim 145, wherein:
   said adhesion coating comprises an α-tantalum layer bonded to said tantalum nitride layer.

147. The electrode of claim 146, wherein said adhesion coating comprises a copper layer bonded to said α-tantalum layer.

148. An electrode for an electrical cell, comprising:
   a) a non-conductive substrate;
   b) an adhesion coating bonded to the non-conductive substrate;
   c) a multilayer working electrode bonded to said adhesion coating, said multilayer working electrode including at least one layer of a first conductive metal, and at least one layer of a second conductive metal; and
   wherein said first and second conductive metals have a Fermi energy difference of at least about 0.5.

149. The electrode of claim 148, wherein:
   said adhesion coating comprises a tantalum nitride layer bonded to said substrate.

150. The electrode of claim 149, wherein:
   said adhesion coating comprises an α-tantalum layer bonded to said tantalum nitride layer.

151. The electrode of claim 150, wherein said adhesion coating comprises a copper layer bonded to said α-tantalum layer.

152. An electrode for an electrical cell, comprising:
   a) a non-conductive substrate;
   b) an adhesion coating bonded to the non-conductive substrate;
   c) a multilayer working electrode bonded to said adhesion coating, said multilayer working electrode including at least one layer of a first conductive metal, and at least one layer of a second conductive metal; and
   wherein said multilayer workin electrode comprises at least four layers.

153. The electrode of claim 152, wherein:
   said adhesion coating comprises a tantalum nitride layer bonded to said substrate.

154. The electrode of claim 153, wherein:
   said adhesion coating comprises an α-tantalum layer bonded to said tantalum nitride layer.

155. The electrode of claim 154, wherein said adhesion coating comprises a copper layer bonded to said α-tantalum layer.

156. An electrode for an electrical cell, comprising:
   a) a non-conductive substrate;
   b) an adhesion coating bonded to the non-conductive substrate;
   c) a multilayer working electrode bonded to said adhesion coating, said multilayer working electrode including at least one layer of a first conductive metal, and at least one layer of a second conductive metal; and
   d) a barrier layer atop said multilayer working electrode.

157. The electrode of claim 156, wherein:
   said adhesion coating comprises a tantalum nitride layer bonded to said substrate.

158. The electrode of claim 157, wherein:
   said adhesion coating comprises an α-tantalum layer bonded to said tantalum nitride layer.

159. The electrode of claim 158, wherein said adhesion coating comprises a copper layer bonded to said α-tantalum layer.

160. An, electrical cell apparatus, comprising an electrode of any of claims 144, 148, 151, and 156.

161. An electrical cell apparatus comprising an electrode, said electrode including:
   a) a non-conductive substrate;
   b) an adhesion coating bonded to the non-conductive substrate;
   c) a multilayer working electrode bonded to said adhesion coating, said multilayer working electrode including at least one layer of a first conductive metal, and at least one layer of a second conductive metal.

162. An electrical cell apparatus comprising an electrode, said electrode including:
   a) a substrate;
   b) an embrittlement-sensitive material on said substrate; and
   c) a protective layer comprising oxygen-free copper protecting said embrittlement-sensitive material.

163. An electrical cell apparatus comprising and electrode, the electrode including:
   a substrate;
   a tantalum nitride layer adhered to said substrate;
   a tantalum layer adhered to said tantalum nitride layer;
   a copper layer bonded to said tantalum layer; and
   a first metal layer bonded to said copper layer.

* * * * *